United States Patent
Li et al.

(10) Patent No.: US 8,565,181 B2
(45) Date of Patent: Oct. 22, 2013

(54) METHODS AND APPARATUS FOR MULTI-CARRIER COMMUNICATIONS WITH EFFICIENT CONTROL SIGNALING

(75) Inventors: Xiaodong Li, Bellevue, WA (US); Titus Lo, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 115 days.

(21) Appl. No.: 13/414,622

(22) Filed: Mar. 7, 2012

(65) Prior Publication Data

US 2013/0201925 A1 Aug. 8, 2013

Related U.S. Application Data

(60) Provisional application No. 61/595,570, filed on Feb. 6, 2012.

(51) Int. Cl.
  *H04W 4/00* (2009.01)
  *H04J 11/00* (2006.01)
  *H04L 1/04* (2006.01)

(52) U.S. Cl.
  USPC .......... 370/329; 370/208; 370/210; 370/330; 370/335; 370/338; 370/310; 370/336; 455/69; 455/562.1; 455/434; 375/147; 375/347; 375/260

(58) Field of Classification Search
  USPC ....................................................... 370/328
  See application file for complete search history.

(56) References Cited

U.S. PATENT DOCUMENTS

| | | | |
|---|---|---|---|
| 7,613,104 B2 * | 11/2009 | Bhatt et al. | 370/208 |
| 7,945,005 B2 * | 5/2011 | Le Saux et al. | 375/347 |
| 7,965,761 B2 * | 6/2011 | Shattil | 375/147 |
| 8,068,466 B2 * | 11/2011 | Muharemovic et al. | 370/335 |
| 8,107,443 B2 * | 1/2012 | Chen et al. | 370/335 |
| 2004/0037215 A1 | 2/2004 | Hwang et al. | |
| 2004/0228283 A1 | 11/2004 | Naguib et al. | |
| 2005/0002324 A1 | 1/2005 | Sutivong et al. | |
| 2007/0036066 A1 * | 2/2007 | Thomas et al. | 370/208 |
| 2008/0062859 A1 * | 3/2008 | Le Saux et al. | 370/210 |
| 2008/0076477 A1 * | 3/2008 | Hedayat et al. | 455/562.1 |
| 2008/0232492 A1 * | 9/2008 | Xiao et al. | 375/260 |
| 2009/0067391 A1 * | 3/2009 | Shen et al. | 370/336 |

(Continued)

OTHER PUBLICATIONS

International Patent Application No. PCT/US2013/024926: International Search Report and Written Opinion dated Apr. 15, 2013, 13 pages.

*Primary Examiner* — Ayaz Sheikh
*Assistant Examiner* — Venkatesh Haliyur
(74) *Attorney, Agent, or Firm* — Woodcock Washburn, LLP

(57) ABSTRACT

A first uplink signal is transmitted by a mobile station to a base station on a first set of subcarriers in a first OFDM symbol. The first set of subcarriers is modulated with a first signal sequence known to both the mobile station and the base station. A second uplink signal is transmitted by the mobile station to the base station on a second set of subcarriers in a second OFDM symbol. The second set of subcarriers is modulated with the first signal sequence or a transform of the first signal sequence. The second set of subcarriers is modulated with a second signal sequence containing attribute information on a third set of subcarriers of a downlink signal received by the mobile station over a downlink channel. The correspondence between the subcarriers in the third and second set is known to the mobile station and the base station.

40 Claims, 17 Drawing Sheets

(56) References Cited

U.S. PATENT DOCUMENTS

| | | | |
|---|---|---|---|
| 2009/0122771 A1* | 5/2009 | Cai ............................ | 370/338 |
| 2009/0280866 A1 | 11/2009 | Lo et al. | |
| 2010/0039970 A1* | 2/2010 | Papasakellariou et al. ... | 370/310 |
| 2010/0203885 A1* | 8/2010 | Chen et al. .................... | 455/434 |
| 2011/0235590 A1* | 9/2011 | Li et al. ......................... | 370/328 |
| 2012/0020323 A1* | 1/2012 | Noh et al. ..................... | 370/330 |

* cited by examiner

METHODS AND APPARATUS FOR MULTI-CARRIER COMMUNICATIONS WITH EFFICIENT CONTROL SIGNALING

CROSS REFERENCE TO RELATED APPLICATIONS

This application claims benefit under 35 U.S.C. §119(e) of Provisional U.S. Patent Application No. 61/595,570, filed Feb. 6, 2012, the contents of which are incorporated herein by reference in their entirety.

BACKGROUND

In wireless communications, control channels are used to facilitate the transmission of system control information that is required in its operation. The amount of control information becomes considerably large in a broadband communication system, which is typically used to provide multimedia services. For example, system control information required in a broadband system may include signal acquisition mechanisms for mobile stations, radio resource allocation for DL and UL transmission, control instructions, feedback of system parameters and acknowledgements, and information for other system functionalities. In order to efficiently and effectively transmit such large amounts of control information, certain methods and apparatus are needed to organize the information and to determine when and how the information is transmitted.

SUMMARY

In accordance with various embodiments of the present invention, a communication system includes a mobile station and a base station. A first uplink signal is transmitted by the mobile station to the base station on a first set of subcarriers in a first Orthogonal Frequency Division Multiplexing (OFDM) symbol. The first set of subcarriers may be modulated with a first signal sequence, the first signal sequence being known to both the mobile station and the base station. A second uplink signal may be transmitted by the mobile station to the base station on a second set of subcarriers in a second OFDM symbol. The second set of subcarriers may be modulated with the first signal sequence or a transform of the first signal sequence. The second set of subcarriers may further be modulated with a second signal sequence, the second signal sequence containing attribute information on a third set of subcarriers of a downlink signal received by the mobile station over a downlink channel. The correspondence between the subcarriers in the third set and the subcarriers in the second set may be known to both the mobile station and the base station.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The present invention will be thoroughly understood from the detailed description given below and from the accompanying drawings of various embodiments of the invention, which, however, should not be taken to limit the invention to the specific embodiments, but are for explanation and understanding only.

DETAILED DESCRIPTION OF ILLUSTRATIVE EMBODIMENTS

Figure 1:
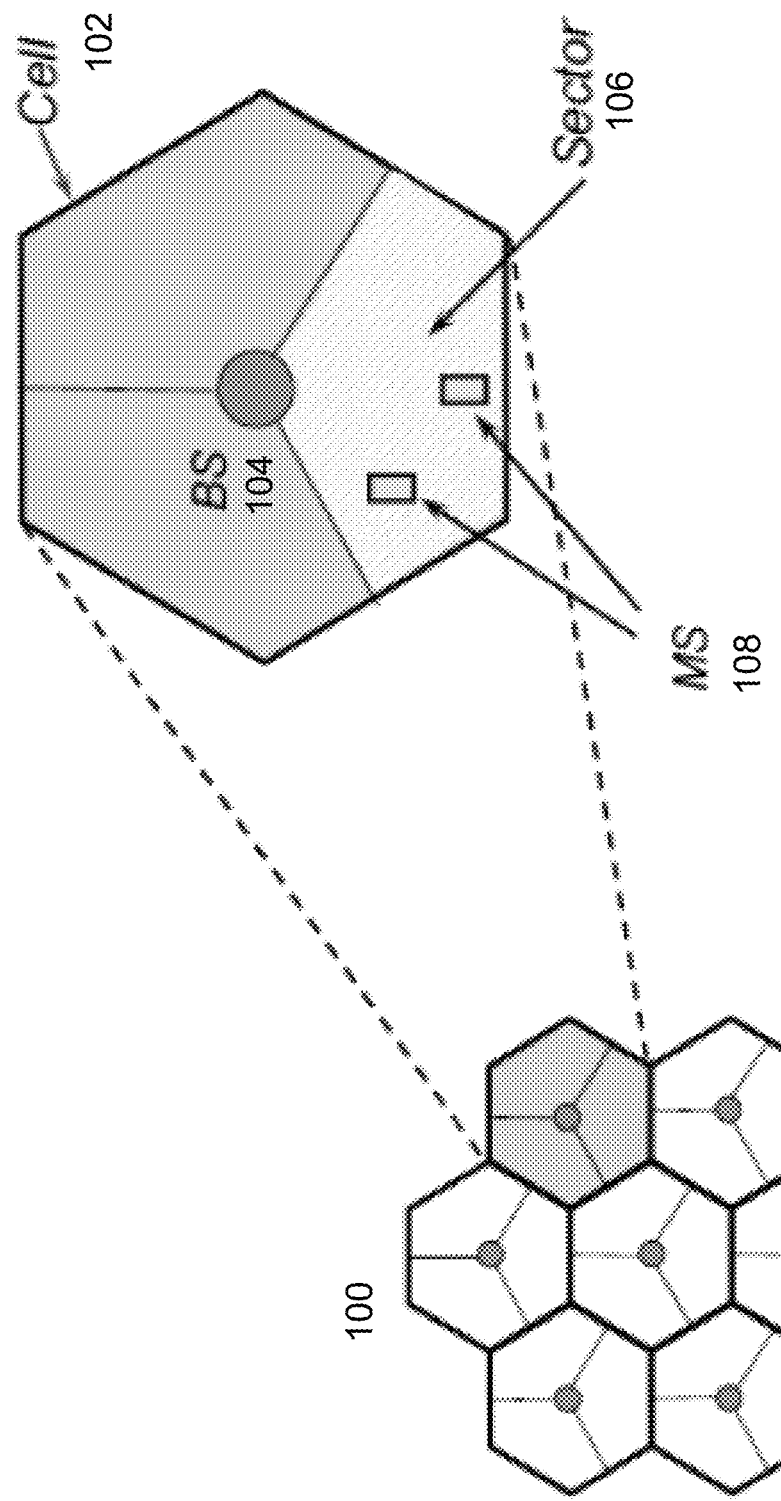
FIG. 1: A cellular wireless network is comprised of a plurality of cells, in each of which the coverage is provided by a BS.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The multi-carrier system mentioned here can be of any format such as Orthogonal Frequency-Division Multiplexing (OFDM), Multi-Carrier Code Division Multiple Access (MC-CDMA), or single carrier-frequency multiplexing (SC-FDMA) possibly implemented in the format of discrete Fourier transform-spreading-OFDM (DFT-S-OFDM). The disclosed methods can also be applied to downlink, uplink, or both, where the duplexing technique is either Time Division Duplexing (TDD) or Frequency Division Duplexing (FDD). Without being explicitly expressed, the term "broadcast" also implies "multicast" throughout this text. Without loss of generality, Orthogonal Frequency-Division Multiple Access (OFDMA) is taken as an example to illustrate the present invention.

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Cellular Wireless Networks

Referring to FIG. 1, in a cellular wireless network, the geographical region to be serviced by the network is normally divided into smaller areas called cells 100. In each cell 100, coverage is provided by a base station (BS) 104. Thus, this type of structure is normally referred to as the cellular structure, as shown in FIG. 1. Within each coverage area, there are located mobile stations (MS's) 108 to be used as an interface between the users and the network. BS 104 is connected to the backbone of the network, usually by a dedicated link. Base station 104 also serves as a focal point to distribute information to and collect information from its mobile stations by radio signals. A cell can also be divided into sectors 106. From system engineering point of view each sector can be considered as a cell. In this context, the terms "cell" and "sector" are interchangeable.

Multi-Carrier Signal Format

The basic structure of a multi-carrier signal in the frequency domain is made up of subcarriers. The subcarriers can be arranged, in a particular manner, into groups to support scalability and multiple-access. The subcarriers forming one group are not necessarily adjacent to each other. The operation bandwidth of a system may vary. A variable bandwidth (VB) system is realized by adjusting the number of usable subcarriers in accordance with the given bandwidth. To facilitate operation of the user terminals in a VB environment, specific signaling and control methods are required. Radio control and operation signaling is realized through the use of a core-band (CB). A core-band, substantially centered at the operating center frequency, is defined as a frequency segment that is not greater than the smallest operating channel bandwidth among all the possible spectral bands that the receiver is designed to operate with.

The basic unit of a multi-carrier signal in the time domain is generally an OFDM symbol. The OFDM time domain waveform is generated by applying the inverse-fast-Fourier-transform (IFFT) to the OFDM signals in the frequency domain. A copy of the last portion of the time waveform, known as the cyclic prefix (CP), is inserted in the beginning of the waveform itself to form the OFDM symbol. The length of the CP in the OFDM symbols can be varied to meet the requirements of different applications such as various cell sizes or configurations.

A subchannel is formed by a group of subcarriers over one or more OFDM symbols.

Hierarchical Frame Structure

Figure 2:
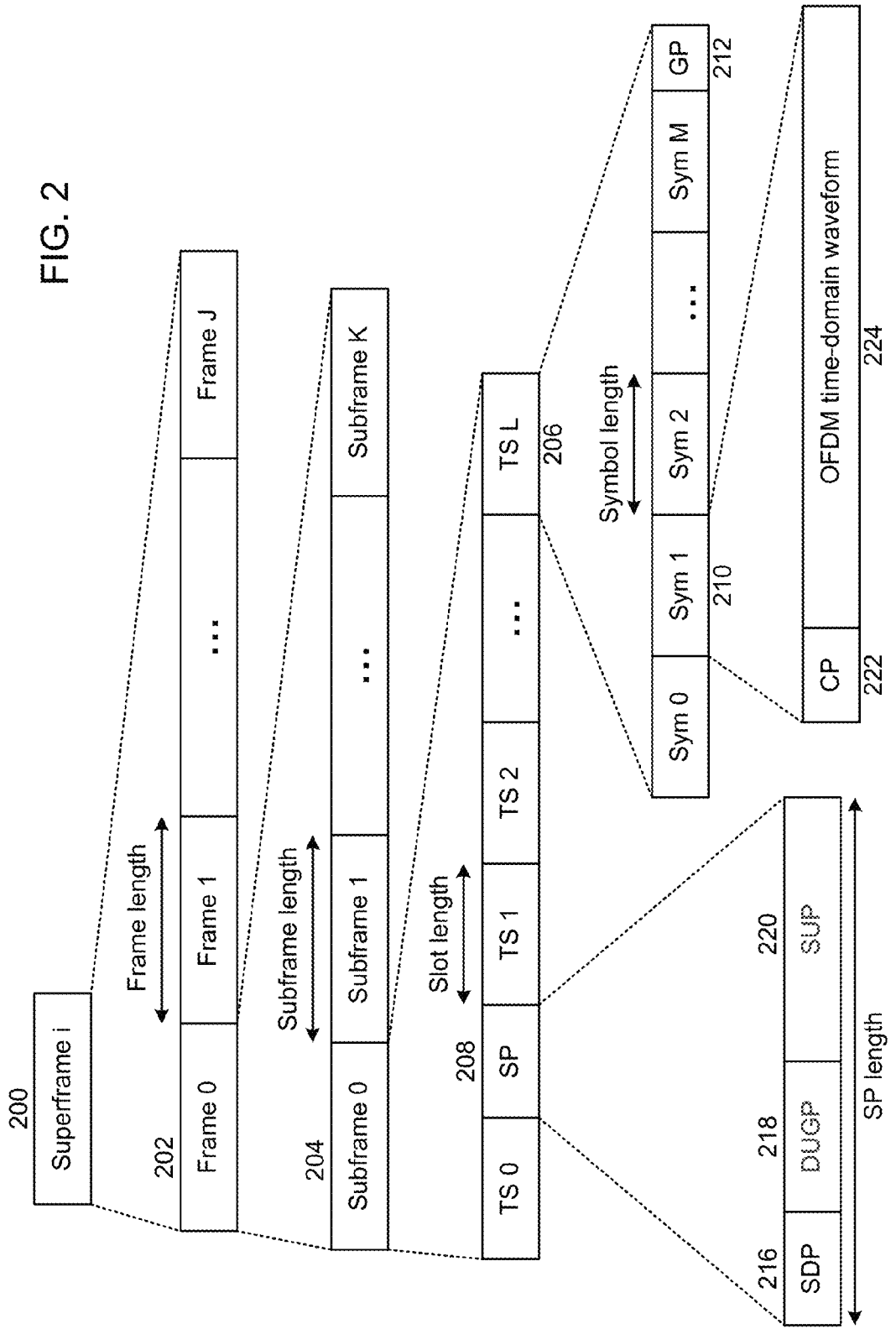
FIG. 2: An example of a frame structure.
Figure 3:
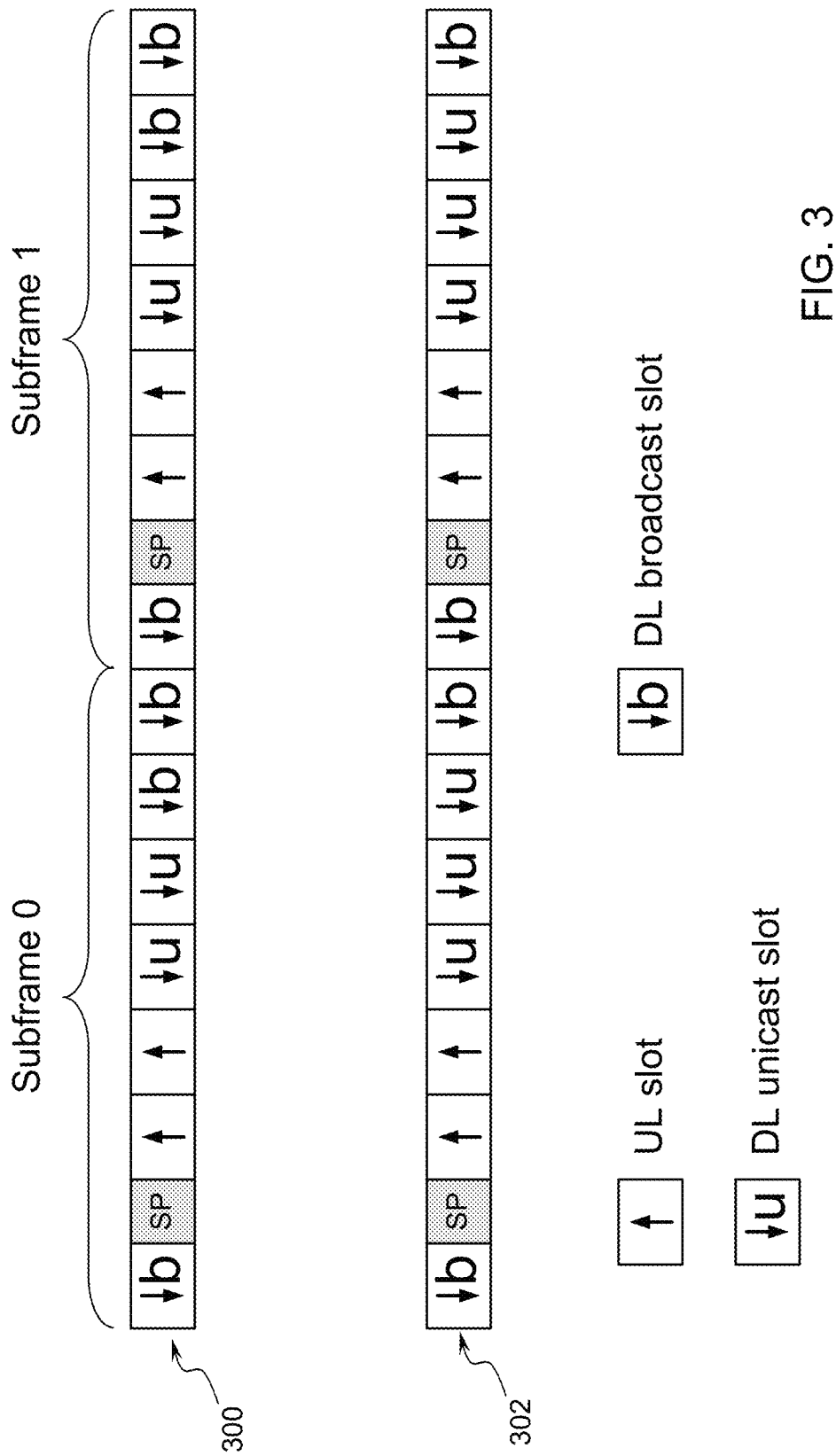
FIG. 3: Examples of allocation of TS's for the use of either downlink (DL) transmission (including unicast, multicast, and broadcast) or uplink (UL) transmission.

In accordance with the principles of the present invention, signal transmission may be carried out using the hierarchical frame structure shown in FIG. 2. The top-level transmission unit may be a superframe 200, which may further consist of multiple frames 202. Each frame 202 in turn may consist of multiple subframes 204. The subframe 204 may consist of a plurality of time-slots (TS's) 206 and a special period (SP) 208. Each TS 206 may comprise multiple OFDM symbols 210 and a small guard period 212. TS 206 can be allocated for the use of either downlink (DL) transmission (including unicast, multicast, and broadcast) or uplink (UL) transmission. For example, in an arrangement 300 shown in FIG. 3, where L=6, two TS's are allocated for UL, two are allocated for DL unicast, and three are allocated for DL broadcast within a subframe. Alternatively, in another arrangement 302 two TS's are allocated for UL, three are allocated for DL unicast, and two are allocated for DL broadcast within a subframe. Furthermore, a BS may use the former TS arrangement and another BS may use the latter TS arrangement, as long as they are synchronized in time frame. The DL broadcast TS's can be further grouped into video bursts, each of which carries an application data stream or a video stream.

Figure 4:
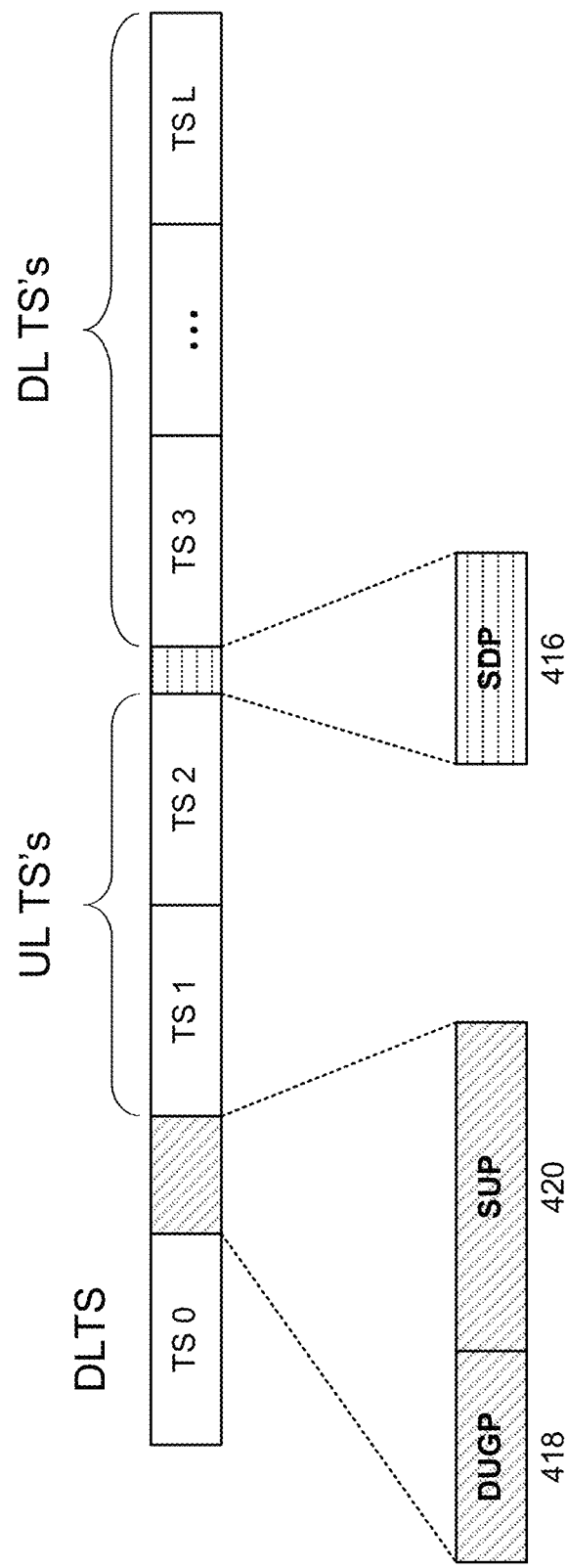
FIG. 4: An Example of the SDP placement, where the SDP is inserted in between the last UL TS and the following DL TS.

SP 208, which is usually placed in the transition from DL transmission to UL transmission, may consist of a special downlink period (SDP) 216, a downlink-to-uplink guard period (DUGP) 218, and a special uplink period (SUP) 220. Alternatively, SDP 416 may be inserted in between the last UL TS and the following DL TS, as shown in FIG. 4.

For the specific example given in Table 1, a superframe, which consists of 10 frames, has the duration of 100 ms. Each 10-ms frame in turn consists of two 5-ms subframes and a subframe consists of 7 TS's and an SP. Each TS has the duration of 675 ps and is comprised of multiple OFDM symbols.

TABLE 1

Numerology for a frame structure.

|  | Duration | Composition |
|---|---|---|
| Superframe | 100 ms | 10 frames |
| Frame | 10 ms | 2 subframes |
| Subframe | 5 ms | 7 time slots + 1 SP |
| Time slot | 675 μs | OFDM symbols |

Hierarchical Control Structure

In accordance with the principles of the present invention, a hierarchical control structure (HCS) may be used in a cellular wireless communication system, wherein the system control information may be grouped into different hierarchies and types such that the control information is transmitted between a BS to its MS's in a spectral-efficient manner. The control information may include signal acquisition mechanisms for mobile stations, radio resource allocation for DL and UL transmission, and information and mechanisms to facilitate other system functionalities.

In accordance with aspects of embodiments of the present invention, the DL control information may be classified into three hierarchies based on their functionality: preambles, superframe control headers (SFCH's), and DL common control channels (D-CCCH's), whereas the UL control channels may include: ranging channels (RCH's) and feedback channels (FBCH's).

In accordance with aspects of embodiments of the present invention, each hierarchy of control information may be further grouped into different types based on certain criteria. For example, parameters that vary relatively slowly can be grouped together to be transmitted relatively infrequently, whereas parameters that change relatively quickly can be grouped together to be transmitted relatively frequently. In addition, the incremental changes or differences with respect to some control parameters are grouped together and transmitted relatively frequently.

Preambles

Preambles are transmitted during a SDP with a predetermined fixed length of cyclic prefix. Preambles are designed to
1. carry essential operation parameters,
2. provide mechanisms for the MS's to synchronize with their serving BS,
3. facilitate the measurements of inter-cell interference, and
4. enable other system functions.

In accordance with embodiments of this invention, multiple types of preambles may be transmitted periodically by a BS. A type of preamble can differ from other types in terms of the information it carries, the way it carries the information, its functionality, the way it is transmitted, and other characteristics. For example, a type of preamble may carry some essential system information, such as the length of the cyclic prefix of the OFDM symbols in various time slots, operation bandwidth, and decoding information for SFCH. Another type of preamble may carry some essential system information for a BS to identify itself or for MS's to synchronize with the network.

Figure 5:
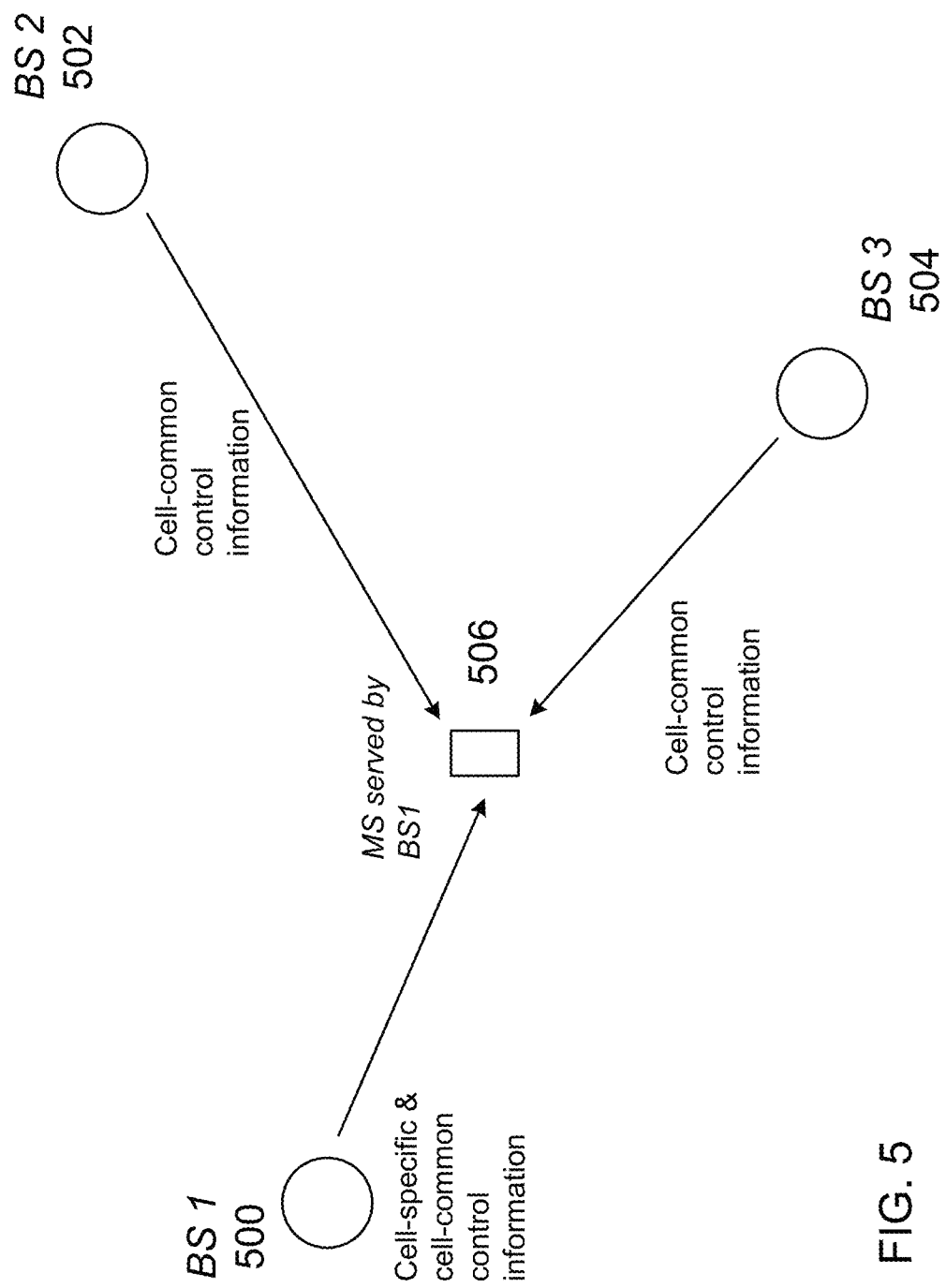
FIG. 5: A scenario of transmission of cell-specific and cell-common control information.

In an embodiment, a type of preamble may be designed to carry essential system information common to a group of cells and a part or the entirety of this type of preamble can be transmitted by such a group of BS's using the same subcarriers, including data and pilot subcarriers, at essentially the same time, wherein macro-diversity can be achieved at the MS to decode the corresponding part or the entirety of that preamble. Such a scenario is shown in FIG. 5, where BS's 500 502 504 transmit cell-common information to MS 506. The cell-common system information carried in this type of preamble may include
1. the length of the cyclic prefix of the OFDM symbols in various time slots,
2. the operation bandwidth,
3. synchronization mechanism,
4. frequency reuse configuration
5. other information.

In another embodiment, a type of preamble may be designed to facilitate cell-specific operation functions and this type of preamble may be transmitted by an individual BS 500 using a code sequence in either the time domain or the frequency domain, which uniquely identifies that BS. The sequence can remain fixed from one subframe to the next or can vary from one subframe to the next in accordance with a particular pattern. The information embedded in this type of preamble may include
1. the cell identification (ID) of the transmitting BS,
2. the decoding information for SFCH's,
3. other information.

In yet another embodiment, a type of preamble may only occupy the core bandwidth, whereas another type of preamble can be designed to either occupy the core bandwidth or the entire channel bandwidth. For example, the use of preambles defined within the core-bandwidth simplifies the complexity in the implementation of initial signal acquisition in that only the signal within the core bandwidth is processed. The use of preambles defined in the entire operation bandwidth enables the MS's to measure inter-cell interference conditions and report to their BS's. Based on the inter-cell interference conditions, a BS may adjust the pilot structure, transmission power, antenna configuration, modulation and coding scheme, subchannel assignment, and operation parameters to optimize the performance/capacity.

In still another embodiment, channel coding may be applied to a type of preamble over multiple subframes or frames. For example, repetition coding can be used to allow a certain type of combination process over time in decoding at the MS to improve the reception performance.

The transmission of the multiple types of preambles may be multiplexed
1. in time, wherein different types of preambles are transmitted at different times (e.g., one type in the SDP's of odd-numbered subframes and another type in SDP's of even-numbered subframes), where the transmission recurrence of each type of preamble is not necessarily the same;
2. in frequency, wherein one type of preamble is transmitted using a set of subcarriers and another type is transmitted using a different set of subcarriers, where each set does not necessarily consist of the same number of subcarriers; or/and
3. in code, wherein the one type of preamble is transmitted using a code sequence and another is transmitted using a different code sequence, where each code sequence does not necessarily use the same amount of time and frequency resources.

Figure 6:
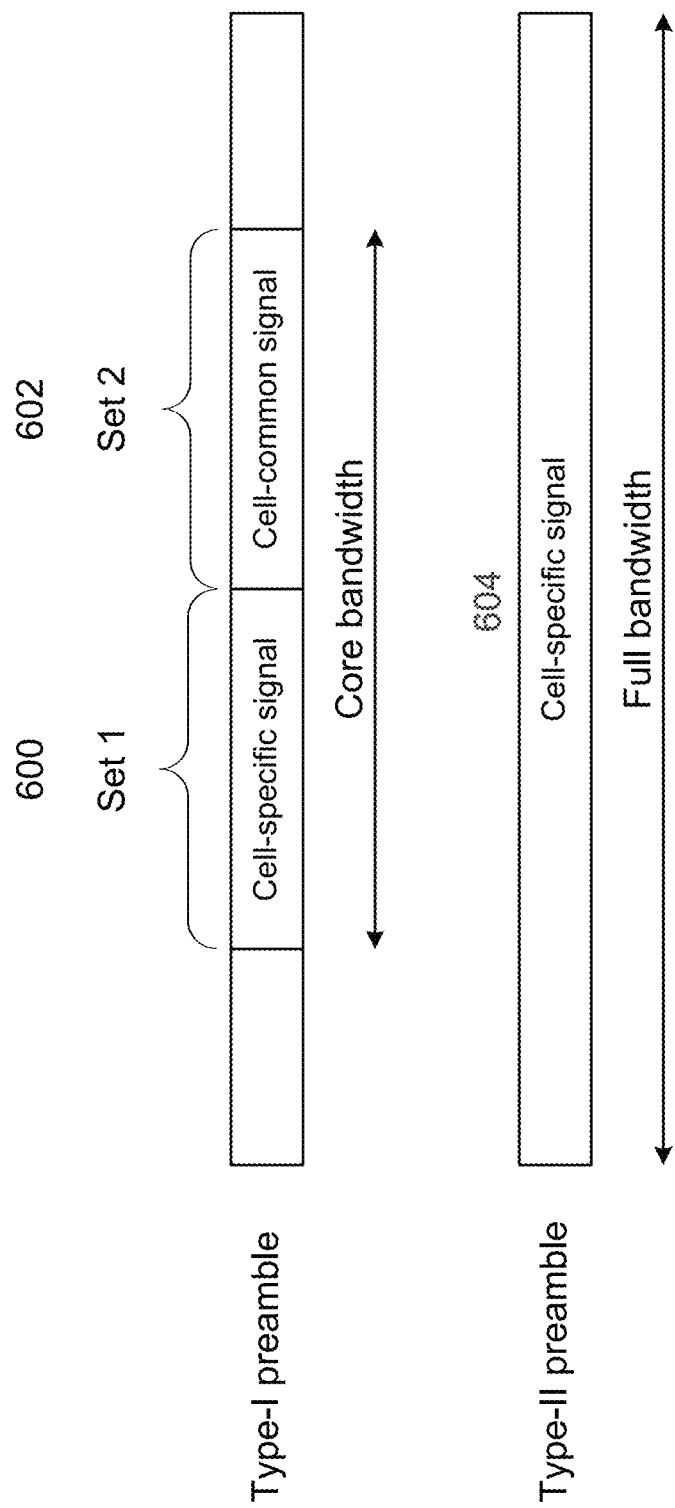
FIG. 6: A specific example of preambles, where two types of preambles are defined: Type-I and Type-II.

In an example shown in FIG. 6, two types of preambles are defined: Type-I and Type-II. The Type-I preamble is defined within the core bandwidth. The subcarriers in the Type-I preamble are further grouped into two sets: Set-1 600 and Set-2 602. The subcarriers in Set-1 are modulated by a cell-specific sequence and the subcarriers in Set-1 carry cell-common information. The Type-II preamble 604 is defined over the full bandwidth. The characteristics of the two types are given in Table 2.

TABLE 2

The characteristics of two types of preambles.

| | Type-I | Type-II |
|---|---|---|
| Functionality | Set-1: for cell search, synchronization<br>Set-2: for carrying system information | Interference measurement, cell search/selection, synchronization |
| CP length | Fixed | Fixed |
| Bandwidth | Core bandwidth | Full bandwidth |
| Composition | Set-1: cell-specific sequence<br>Set-2: Cell-common information-carrying subcarriers | Cell-specific sequence |
| Information content | Set-1: Cell ID<br>Set-2: CP length for data slots | |
| Transmission | Set-1: a BS Transmits its own sequence<br>Set-2: macro-diversity by BS's | A BS Transmits its own sequence |

SFCH

The SFCH's of each superframe may carry relatively detailed control information regarding
 1. the transmission configurations of the current superframe,
 2. the instructions for decoding the D-CCCH's, and
 3. certain system operations.

The SFCH's can be transmitted in any DL TS. The assignment information of SFCH's, such as their locations, sizes, and/or modulation/coding schemes, may be specified in the preambles. Alternatively, such assignment may be predetermined in the system specifications. For example, the SFCH's in each superframe can be pre-assigned to Subchannel 0 in the TS0 in Subframe 0 in Frame 0.

In accordance with other embodiments of this invention, multiple types of SFCH's may be transmitted periodically by a BS. A type of SFCH differs from another in terms of the information it carries, its functionality, the way it is transmitted, and other characteristics. For example, a type of SFCH may carry some essential system information, such as video broadcast configuration, BS antenna configuration, the CP lengths of TS's, and D-CCCH decoding information, whereas another type of SFCH may carry some essential system information, such as superframe number index and UL/DL configuration. In addition, a type of SFCH may also carry an optional or reserved field to provide the flexibility to add temporally required information.

In an embodiment, a type of SFCH may be designed to carry some essential system information common to a group of cells and a part or the entirety of this type of SFCH can be transmitted by such a group of BS's using the same subcarriers, including data and pilot subcarriers, at essentially the same time, wherein macro-diversity can be achieved at the MS to decode the corresponding part or the entirety of that particular SFCH. Such a scenario is shown in FIG. 5, where BS's 500 502 504 transmit cell-common information to MS 506. The cell-common system information carried in this type of SFCH may include
 1. superframe number index,
 2. UL/DL configuration,
 3. frequency reuse configuration,
 4. other information.

In another embodiment, a type of SFCH may be designed to carry some essential system information unique to an individual cell and this type of preamble may be transmitted by an individual BS 500 using cell-specific physical resources and means, such as time, frequency, coding, and scrambling. The cell-specific system control information carried in this type of SFCH may include
 1. TS configuration,
 2. video broadcast configuration,
 3. BS antenna configuration,
 4. the CP lengths of data TS's,
 5. D-CCCH decoding information,
 6. other information.

In yet another embodiment, a SFCH can be designed to either occupy the core bandwidth or the entire channel bandwidth.

In still another embodiment, channel coding may be applied to a type of SFCH over multiple superframes. For example, repetition coding can be used to allow a certain type of combination process over time in decoding at the MS to improve the reception performance.

In a further embodiment, the transmission of the multiple types of SFCH's may be multiplexed
 1. in time, wherein different types of SFCH's are transmitted in different times (e.g., in different OFDM symbols); or/and
 2. in frequency, wherein one type of SFCH is transmitted using a set of subcarriers and another type is transmitted using a different set of subcarriers, where each set does not necessarily consist of the same number of subcarriers.

In accordance with other embodiments of this invention, a serving BS may transmit to its MS's a part or the entirety of a type of SFCH associated with a neighboring cell, wherein information in this type of SFCH may be exchanged between BS's through the backbone network connecting them. These embodiments can be used to facilitate the fast acquisition of system control information from neighboring cells during the handoff, thereby accelerating the handoff process. The information to be exchanged may include
 1. TS configuration,
 2. video broadcast configuration,
 3. BS antenna configuration,
 4. the CP lengths of data TS's,
 5. D-CCCH decoding information,
 6. other information.

In an embodiment, such transmission may be carried out periodically or by the request of an MS that is served by this BS. In another embodiment, the time and frequency resource for the transmission may be assigned by a type of SFCH transmitted by the serving BS.

D-CCCH

The D-CCCH's in a TS may carry detailed control information, instructions for resource allocation, and other directives for the current TS as well as the subsequent multiple TS's. The D-CCCH's can be transmitted in any DL TS (including any data or video TS). In a special case, the SFCH's and D-CCCH's may be transmitted all within a particular DL TS (say, TS0). A typical D-CCCH may include the following entries
 1. DL resource assignment entry
 2. Access grant entry
 3. UL power control entry
 4. UL HARQ (hybrid automatic repeat request) ACK (acknowledgement) feedback entry
 5. UL resource assignment entry
 6. Feedback resource assignment entry An entry is a set of specific instructions and information with an appropriate type of message header and/or tail. For example, in the DL resource assignment entry, the MCS, resource, and HARQ instruction for a DL transmission that is associated with a particular MS are provided, DL resource assignment entry
{
  MS ID
  MCS instruction
  DL resource location and size
  HARQ instruction
}

A D-CCCH may also carry assignment information (e.g., by means of tail-bit indicator) to identify an additional D-CCCH allocated within the current TS or allocated in a subsequent TS, wherein the additional D-CCCH contains supplementary control information. Alternatively, a D-CCCH can be specified through the TS control header (TSCH), which may provide additional flexibility in some systems. The location, size, and/or modulation/coding scheme of the TSCH are specified in a SFCH.

In accordance with aspects of embodiments of this invention, multiple types of D-CCCH's may be transmitted periodically by a BS. A type of D-CCCH differs from another in terms of the information it carries, the way it is transmitted, and other characteristics.

Figure 7:
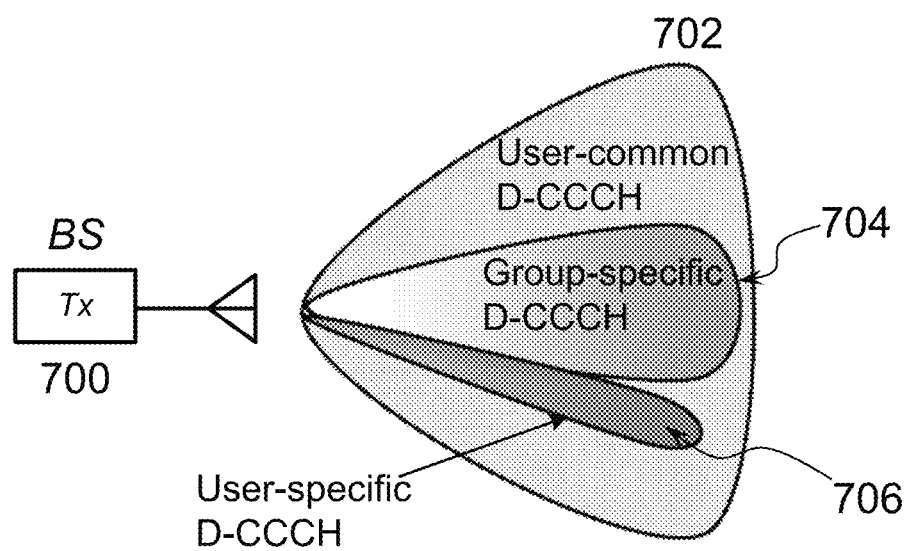
FIG. 7: An example of transmitting D-CCCH's with various types of beamforming

In an embodiment, a type of D-CCCH may be designed to carry detailed control information that is unique to an individual MS and this type of D-CCCH can be transmitted using selective unicast methods. For example, a narrow antenna beam 706 can be formed on the D-CCCH dedicated to the MS as shown in FIG. 7.

In another embodiment, a type of D-CCCH may be designed to carry detailed control information to a particular group of MS's that possess certain characteristics in common. For example, MS's can be grouped together if 1. they are assigned to use the same time-frequency resource for feedback in the UL TS's;
2. they are scheduled to send HARQ feedbacks at essentially the same;
3. they are assigned with the same assignment pattern; and/or
4. they are geographically located in proximity.

This type of D-CCCH can be transmitted using multicast methods, such as multiple beams (orthogonal or otherwise) or directive beams in azimuth and/or elevation. For example, the D-CCCH for a group of MS's located in proximity can be transmitted using a directive beam 704, as shown in FIG. 7. The members in the group can change from one time to another, depending on their commonality. The beamwidth or beam-shape of the beam covering the group may also vary from one time to another, depending on the locations of the MS's in the group.

In yet another embodiment, a type of D-CCCH may be designed to carry detailed assignment information relevant to all the MS's within a cell and this type of D-CCCH is transmitted using broadcast or multicast methods within a cell. For example, a fixed sector beam 702 is used to broadcast the D-CCCH to all the MS's within the sector, as shown in FIG. 7.

In still another embodiment, a type of D-CCCH may be designed to carry some system information common to a group of cells and a part or the entirety of this type of D-CCCH can be transmitted by such a group of BS's using the same subcarriers, including data and pilot subcarriers, at essentially the same time, wherein macro-diversity can be achieved at the MS to decode the corresponding part or the entirety of that particular D-CCCH. Such a scenario is shown in FIG. 5, where BS's 500 502 504 transmit cell-common information to MS 506. The cell-common system information carried in this type of D-CCCH may include scheduling information for video bursts, which consists of the control and decoding information for various video streams.

The transmission of the multiple types of D-CCCH's may be multiplexed 1. in time, wherein different types of D-CCCH's are transmitted in different times (e.g., in different OFDM symbols); or/and
2. in frequency, wherein one type of D-CCCH is transmitted using a set of subcarriers and another type is transmitted using a different set of subcarriers, where each set does not necessarily consist of the same number of subcarriers.

A D-CCCH may be transmitted using variable modulation and coding schemes (MCS's) and its location, size, and/or MCS may be directly specified in a SFCH. A constant MCS can be used to transmit a type of D-CCCH, where the particular MCS to be used may be predetermined based on system deployment conditions. Alternatively, a semi-static MCS can be used to transmit a type of D-CCCH, where the decision on the particular MCS to be used is based on the long-term coverage statistics reported by the MS's and the MCS is specified in a type of SFCH. Furthermore, AMC can be applied to transmit a type of D-CCCH, where MS's are partitioned into groups according to their DL AMC schemes and the D-CCCH entries for the each group are coded together using the same AMC scheme and protected by a CRC or checksum.

In accordance with other embodiments of this invention, specific parameters such as the TS index and the group ID may be included in a type of D-CCCH to facilitate a certain transmission process. The TS index is referred to as the number identifying one of the TS's in a subframe, frame, or superframe. The group identification (Group ID) is defined as the number identifying one of the groups to which multiple MS's of a certain commonality belong.

In an embodiment, a type of D-CCCH may carry the control information for the current TS as well as the control information for the subsequent multiple DL TS's. The control information for a particular TS or for the subsequent TS's can be placed within an information field that is associated with the TS index. For example, in specifying the control information for a set of TS's, an entry of the D-CCCH may be arranged as For each TS in the set
{
TS Index
  Various entries for control information and assignments associated with this
TS;
}

In a more general case, the control information for multiple contiguous TS's can be specified in a single entry. For example, in specifying the control information multiple TS's, reference point (e.g., starting or ending TS index) is given in the D-CCCH entry, which may be arranged as For each TS as the starting/ending point
{
Starting/ending TS Index
  Various entries for control information and assignments associated with this starting/ending TS;
}

Figure 8:
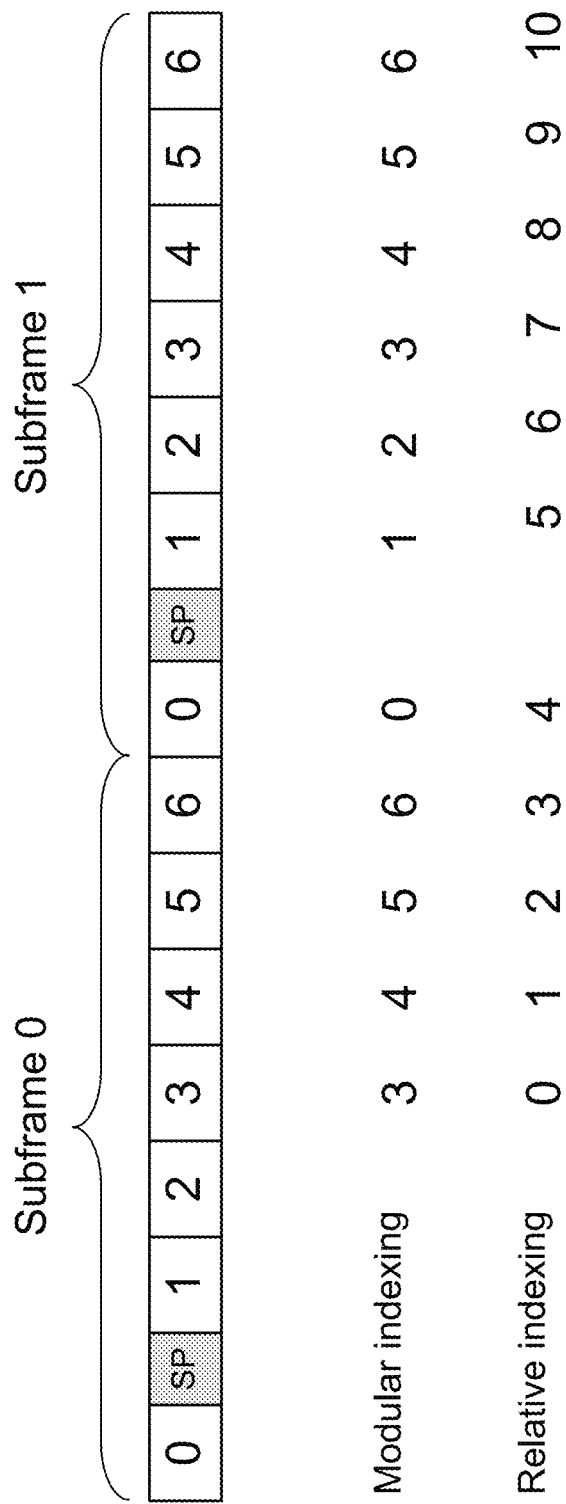
FIG. 8: Examples of TS indexing used in a D-CCCH.

The TS index in a D-CCCH can be a modular number of L. For example, in the case of L=6, the TS index=0, 1, 2, 3, 4, 5, 6, 0, 1, 2, 3, 4, 5, 6, . . . If the TS index of the current TS (i.e., where the D-CCCH is) is n, the immediately following TS indices (n+1, n+2, . . . , L) correspond to the TS's in the current subframe, the next set of modular numbers (0, 1, . . . , L) correspond to the TS's in the next subframe, and so on, as depicted in FIG. 8. Alternatively, The TS index in a D-CCCH can be a relative number. For example, the current TS is indexed to be 0 (or any default number) and the indices for the subsequent TS's increment by one. The TS index is reset by the next D-CCCH.

In another embodiment, a type of D-CCCH may carry the control information for one or more groups. The control information for a particular group can be placed within an information field that is associated with the Group ID. For example, a part of the structure of the D-CCCH may be arranged as For each group to be specified
{
Group ID
   Various entries for control information and assignments associated with this group
}

Each information field associated with a particular group may be encoded individually with some coding and modulation scheme. Furthermore, each group information field can be protected by an error-detection coding scheme (e.g. CRC or checksum) or the entire D-CCCH can be protected by an error-detection coding scheme.

Acquisition by MS

In accordance with aspects of the embodiments of this invention, an MS may extract the operation parameters and system information from the preambles, SFCH's and D-CCCH's.

In an embodiment, an MS may extract system parameters and control information by directly decoding the preambles, SFCH's and D-CCCH's in an orderly manner.

In another embodiment, an MS may optimize the estimation of synchronization timing for unicast and broadcast differently. In unicast transmission and reception, an MS determines the synchronization timing based on the cell-specific preamble transmitted by its serving BS. In reception of broadcast video, an MS determines the synchronization timing based on the cell-specific preamble and/or cell-common preambles, taking into consideration of the different delays in transmission from BS's other than the serving BS. For example, the MS can take the average (weighted or otherwise) of different delays in determining its synchronization timing.

In yet another embodiment, the MS may determine some operation parameters such as operation bandwidth, BS transmission mode (e.g., multiple-input multiple-output mode), and DL/UL configuration via ways of signal processing and detection without explicit control information. For example, the operation bandwidth can be determined based on the energy profile of the preambles in the frequency domain; the BS transmission mode can be determined on the pilot structure and/or pilot energy if a transmission mode is uniquely associated with a particular pilot structure and/or pilot energy; or the DL/UL configuration can be determined by finding the UL/DL switching point, which can be achieved based on the difference between the energy profiles in the time and/or frequency domains of the OFDM symbols in UL and DL TS's.

RCH's

The RCH's provide mechanisms for 1. an MS to report the propagation channel conditions (e.g., delay, attenuation, frequency responses for one or more special channels) to its serving BS,
2. a MS to request access to a particular BS when starting up or when handing-over from another cell
3. a MS to request for bandwidth for transmission
4. other mechanisms.

In accordance with other embodiments of this invention, multiple types of RCH's can be transmitted by an MS. A type of RCH differs from another in terms of their functionalities. For example, a type of RCH can be used for 1. initial ranging, wherein after powering up, an MS sends a signal via the RCH to its serving BS to initiate the process of accessing the network;
2. periodic ranging, wherein when connecting to its serving BS, an MS periodically sends a signal via the RCH to the BS to maintain the uplink synchronization;
3. handover ranging, wherein during handover, an MS sends a signal via the RCH to initiate the process to synchronize with the target BS;
4. bandwidth request, wherein an MS sends a signal via the RCH to its serving BS to indicate its request for time-frequency resource for uplink transmission;
5. channel sounding, wherein an MS sends a signal via the RCH to its serving BS to facilitate the BS to estimate the channel responses between the MS and the BS and/or interference levels; or
6. other kinds of system functions.

A signal sequence via an RCH can be a code sequence in either the time or frequency domain and consists of a set of subcarriers that are distributed over a part of or the entire operation bandwidth. The signal sequence may be known to both the mobile station and the serving base station An MS transmits an RCH signal to its serving BS by self initiation when necessary or by the request of its serving BS (e.g., polling). Either binary or non-binary sequences can be used to modulate with the subcarriers in an RCH. Open-loop or closed-loop power control can also be applied to a type of RCH, including the channel-sound RCH.

In an embodiment, the RCH's may be normally transmitted during a SUP or can also be inserted in an UL TS. The transmission of the multiple types of RCH's may be multiplexed 1. in time, wherein different types of RCH are transmitted in different times, where the transmission recurrence of each type of RCH is not necessarily the same; for example,
   a. one type of RCH is transmitted in the SUP's of odd-numbered subframes and another type is in the SUP's of even-numbered subframes; or
   b. an SUP is divided into multiple periods (of an equal size or otherwise), via each of which a type of RCH is transmitted, wherein the RCH signal can be a shortened OFDM symbol with a CP that is generated by various methods such as using an IFFT with the corresponding length or taking one of the periodical replica that are produced by applying a full length IFFT to a frequency-domain signal with every $n^{th}$ subcarrier being modulated with a desirable complex amplitude and other subcarriers being zero in amplitude;
2. in frequency, wherein one type of RCH is transmitted using a set of subcarriers and another type is transmitted using a different set of subcarriers, where each set does not necessarily consist of the same number of subcarriers; or/and
3. in code, wherein the one type of RCH is transmitted using a code sequence and the another is transmitted using a different code sequence, where each code sequence does not necessarily use the same amount of time and frequency resources.

Figure 9:
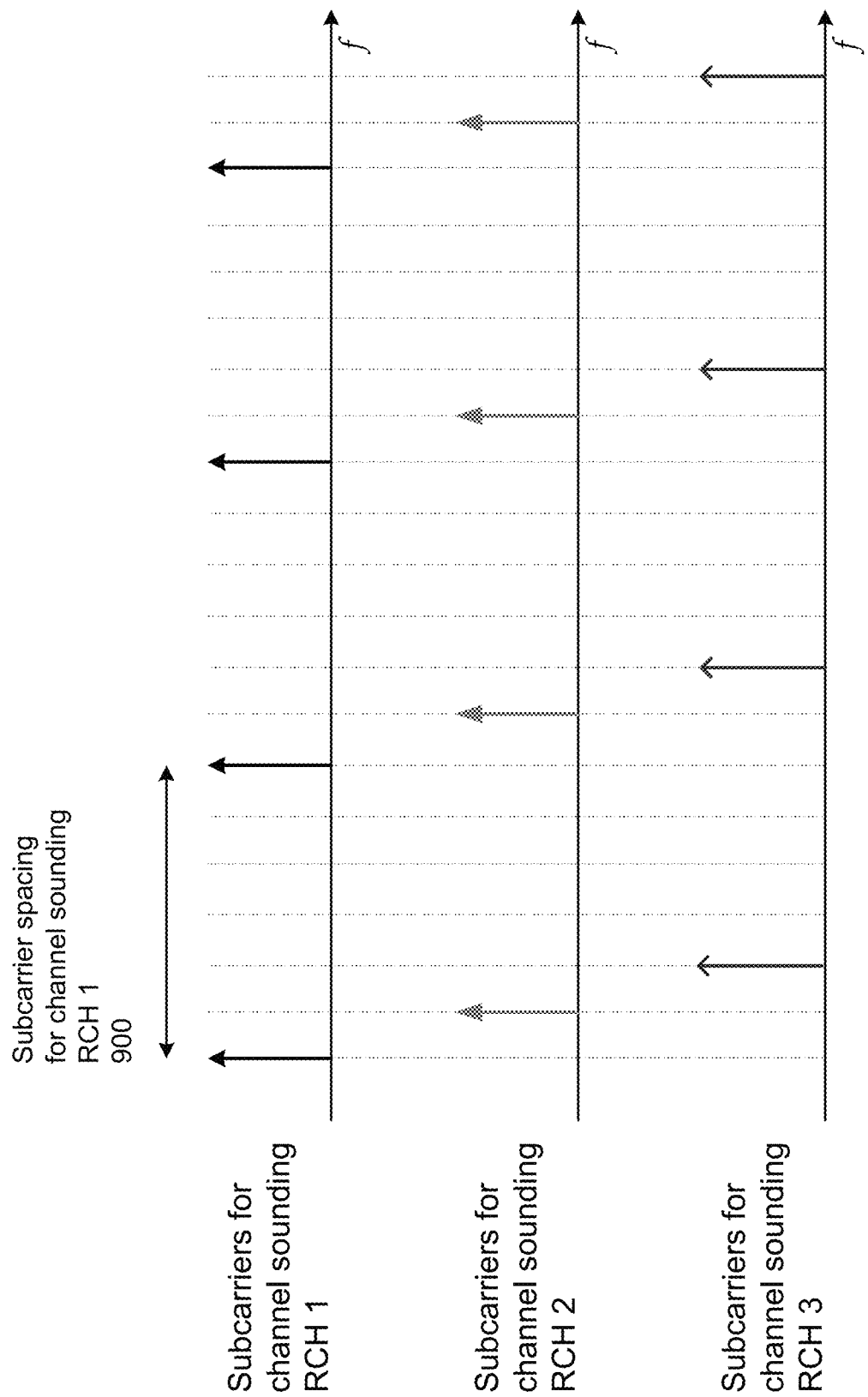
FIG. 9: An example of forming a channel-sounding RCH, where every nth subcarriers are used to formed the signal sequence in an interleaving fashion and n is a positive integar.

In an embodiment, the subcarriers in the signal sequence for channel sounding, which may be less than the total usable subcarriers within the entire bandwidth, may be distributed, uniformly or otherwise, across a part of or the entire bandwidth. For example, in a channel-sounding RCH every $n^{th}$ subcarrier is used to form the signal sequence in an interleaving fashion shown in FIG. 9. As a result, n non-overlapping signal sequences can be generated for channel-sounding. The subcarrier spacing for channel sounding 900 is preferably less than the coherence bandwidth of the channel. The amplitudes of the subcarriers in an RCH are not necessarily equal.

In one embodiment, the subcarriers in an RCH may be equal in energy. In another embodiment, the subcarriers in an RCH may be different in energy.

Figure 10:
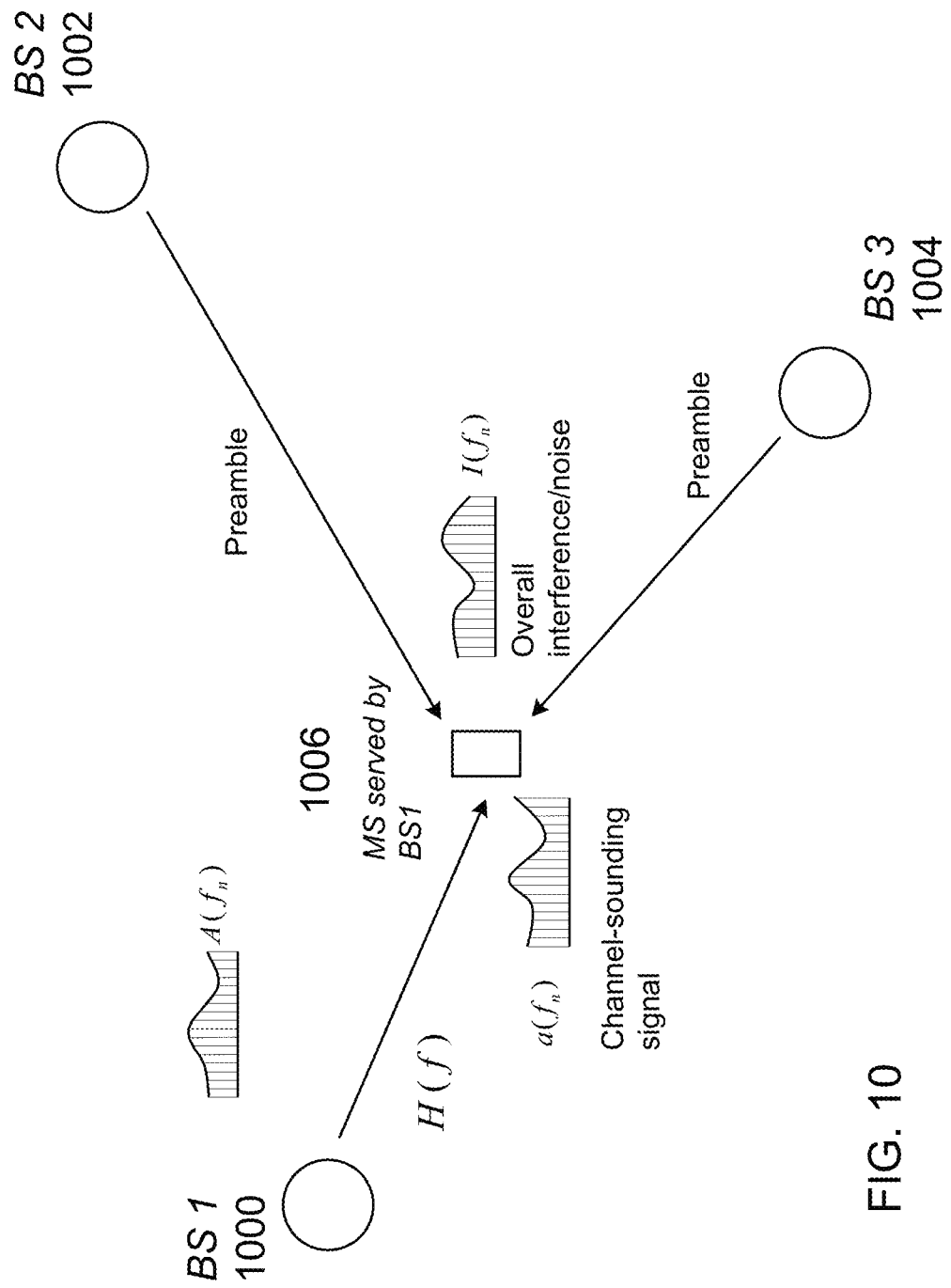
FIG. 10: An example of transmitting the indication of inter-cell interference to the serving BS by an MS.

In another embodiment, an MS can deliver the attribute information on the interference from neighboring BS's to its serving BS via a channel-sounding RCH. This enables the serving BS to assess the level of the signal-to-interference-plus-noise ratio (SINR) at that MS and to assign the appropriate subchannels to that MS according to some criteria. An MS is able to estimate the channel response from a neighboring BS based on a particular signal (e.g., a type of preamble or pilots) sent out by this neighboring BS. Such a channel response is actually the interference experienced by that MS. As shown in FIG. 10, an MS 1006 is subject to the interference from the interfering BS's 1002 1004. By processing the signals from the neighboring cells, the MS is able to generate an overall interference/noise profile.

Let by I(f) denote the attribute information as a function of frequency within the channel bandwidth. To deliver the attribute information to the serving BS 1000, the MS embeds a function of I(f) (e.g., by modulating a signal sequence carrying the attribute information, I(f)) in the channel-sounding signal or in a transform (e.g., a conjugation or absolute value) of the channel-sounding signal. For example, the amplitude of the $n^{th}$ subcarrier, $a(f_n)$, in the channel-sounding sequence can be proportional to the inverse of $|I(f_n)|$; that is $$a(f_n) = \frac{K}{|I(f_n)|}$$

where K denotes the energy normalization factor. In a more practical implementation, quantization and noise, $N(f_n)$, are also considered, $$a(f_n) = Q_b\left[\frac{K}{|I(f_n) + N(f_n)|}\right]$$

where $Q_b[\bullet]$ represents the operation of quantization with b bits. $a(f_n)$ can also be determined using a lookup table. At the serving BS, the response of the $n^{th}$ subcarrier in the received signal is given by $$A(f_n) = a(f_n) \cdot H(f_n)$$

where H(f) denotes the frequency response of the channel between the MS and the serving base. In effect, the serving BS obtains an SINR profile for that MS. The serving BS selects the available subchannels with certain SINR values required by some criteria (e.g., best SINR or SINR sufficient for a particular MCS) and assigns them to the MS for data transmission with an appropriate MCS. In the case where there is UL interference, the response of the $n^{th}$ subcarrier in the received signal becomes $$R(f_n) = A(f_n) + J(f_n)$$

where $J(f_n)$ denotes the UL interference/noise. A channel-sounding signal modulated with a sequence known to both the MS and BS (e.g., equal amplitudes for all the subcarriers) can be transmitted by the MS to assist the BS to estimate $J(f_n)$ and remove it from $R(f_n)$ to obtain $A(f_n)$.

In the case where multiple antennas are used at the BS, the serving BS calculates the overall SINR with multiple-antenna transmission based on some algorithm (e.g., maximum ratio combining or equal-gain combining), selects the subchannel with certain overall SINR values by some criteria, and assigns them to the MS for data transmission.

FBCH's

Figure 11:
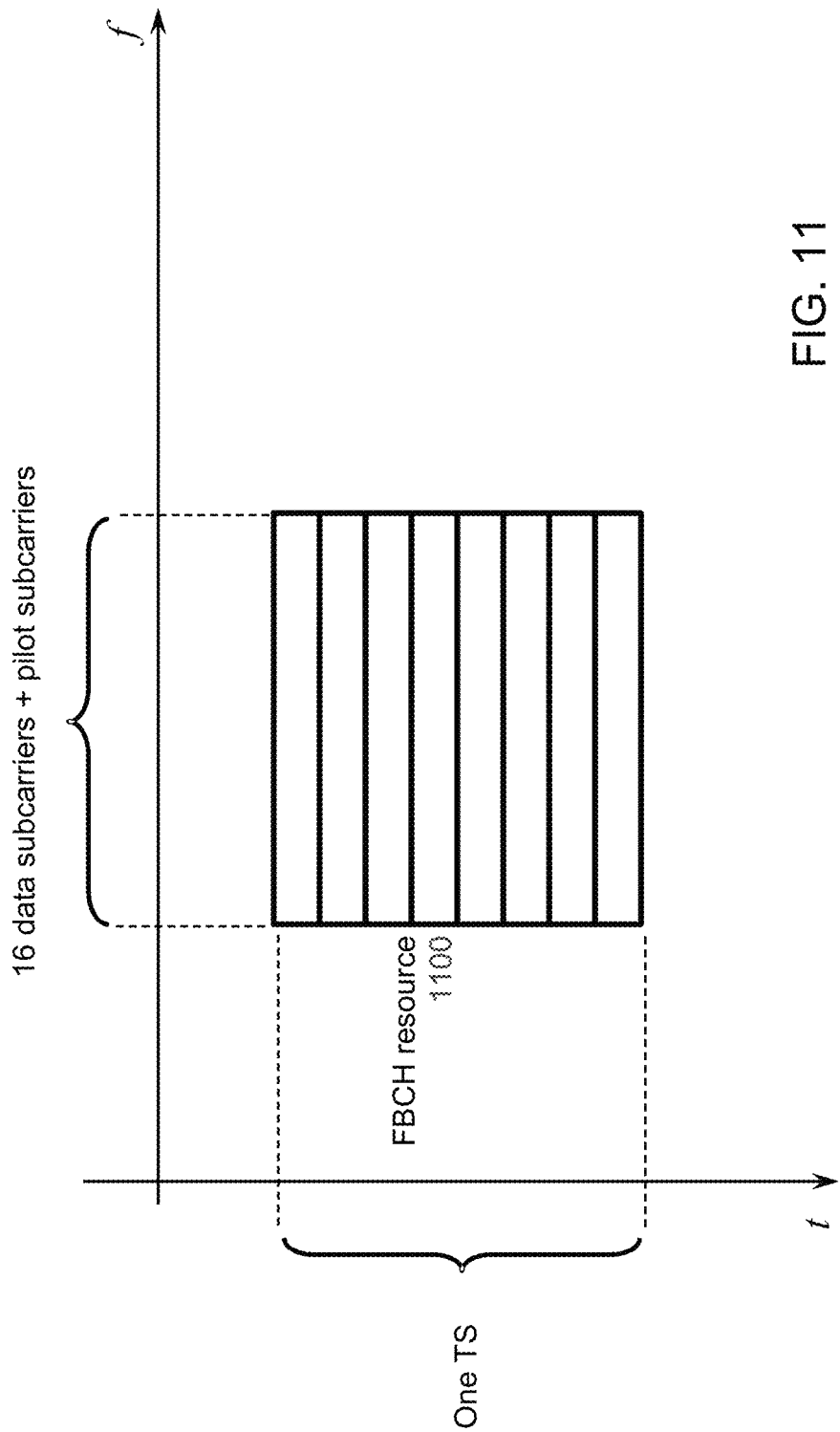
FIG. 11: An example of a typical FBCH resource region.

The FBCH's provide time and frequency resources for one or more MS's to send an acknowledgement (ACK) signal to confirm the success or failure of a particular DL transmission or to report the channel quality indication (CQI) with respect to a particular DL subchannel. In terms of resource, an FBCH consists of multiple subcarriers over one or more OFDM symbols, which are referred to as the FBCH resource region. For example, in FIG. 11 is shown a typical resource region of an FBCH 1100, where there are 16 subcarriers over a TS (8 OFDM symbols). The subcarriers in an FBCH are not necessarily contiguous. A FBCH may consist of subcarriers distributed over the operation bandwidth or of multiple segments distributed over the operation bandwidth, where each segment consists of a plurality of contiguous subcarriers. Pilot subcarriers can be inserted within or outside of the FBCH resource region in a time-division multiplexing, frequency-division multiplexing, or code-division multiplexing manner.

An FBCH resource region in a UL TS is specified with certain definitions (e.g., its beginning time-frequency coordinates or the beginning coordinate with length) in a particular entry in a D-CCCH.

An FBCH may have a one-to-one correspondence to a DL TS; that is, the FBCH is used to report feedbacks associated with that DL TS. An FBCH may also correspond to multiple DL TS's, which is usually the case in a TDD system, where there are normally more DL TS's than UL TS's. In one embodiment, one or more FBCH resource regions can be defined in a particular UL TS, each of which is specified via a D-CCCH in a DL TS. In another embodiment, a common FBCH resource region in a particular UL TS is shared by multiple DL TS's, where the resource region is specified via a D-CCCH in one of the DL TS's.

In an FBCH, there may be multiple feedback entries. A FBCH feedback entry may be defined as the information symbols that an MS uses to report its feedback. Entries from multiple MS's may be multiplexed 1. in frequency, where different entries respectively use different sets of subcarriers in the FBCH resource region, and/or
2. in time, where different entries respectively occupy different OFDM symbols in the FBCH resource region.

In accordance with other embodiments of this invention, a FBCH feedback entry may be transmitted by an MS using a particular MCS and the modulation method can be either coherent or non-coherent (e.g., orthogonal or bi-orthogonal techniques). Furthermore, the MCS for a type of FBCH (e.g., CQI) may be different from that for another type (e.g., ACK).

In an embodiment, a fixed MCS can be predefined, based on deployment conditions, for all the feedback entries in an FBCH. Alternatively, a semi-static MCS may be used for all the feedback entries in an FBCH, where the decision on the particular MCS to be used is based on the long-term coverage statistics reported by the MS's and the MCS to be used is specified within a superframe in a type of SFCH.

In another embodiment, adaptive modulation and coding (AMC) can also be used for an individual feedback entry or a group of feedback entries in an FBCH, where the decisions on the MCS's are made by the serving BS based on certain criteria (e.g., the history of signal reception quality from previous UL transmission of data or FBCH entries by the MS's). The instructions on the MCS may be provided in an entry or entries in a D-CCCH. The AMC instruction may consist of a number of bits that identify one of the predefined MCS's. For example, the MCS instructions for a type of CQI FBCH are tabulated in Table 3, where each CQI feedback entry uses four information bits.

TABLE 3

MCS instructions for an FBCH.

| FBCH MCS | Required resource |
|---|---|
| 00 | 16 subcarriers (QPSK with ⅛ spreading) |
| 01 | 8 subcarriers (QPSK with ¼ spreading) |
| 10 | 4 subcarriers (QPSK with ½ spreading) |
| 11 | No feedback |

In yet another embodiment, the AMC may be used in conjunction with power control to transmission of an FBCH. The MCS for an MS or a group of MS's is first determined and the transmission power level is adjusted based on some criteria. Alternatively, the transmission power level may first be determined and the MCS adjusted to meet some transmission requirements.

In accordance with other embodiments of this invention, the specifications of the FBCH feedback entries (e.g., their locations, MCS's, and corresponding MS's) may be broadcasted by the serving BS to its MS's via a type of D-CCCH. The specifications of the FBCH feedback entries may be explicitly defined in an entry of a D-CCCH. For example, the FBCH assignment entry can be established in the D-CCCH to provide the specifications of the FBCH feedback entries:

FBCH assignment entry
{
  MS ID
  MCS for FBCH feedback entry
  Location of FBCH feedback entry
}

Alternatively, the specifications of the FBCH feedback entries can be embedded in the DL resource assignment entry. For example, DL resource assignment entry
{
  MS ID
  MCS instruction for this DL transmission
  DL resource location and size
  HARQ instruction
  MCS for FBCH feedback entry
  Location of FBCH feedback entry
}

In accordance with other embodiments of this invention, rules (explicit or otherwise) may be established to reduce the overhead in the specifications of the FBCH feedback entries and to efficiently make use of a FBCH resource region.

Figure 12:
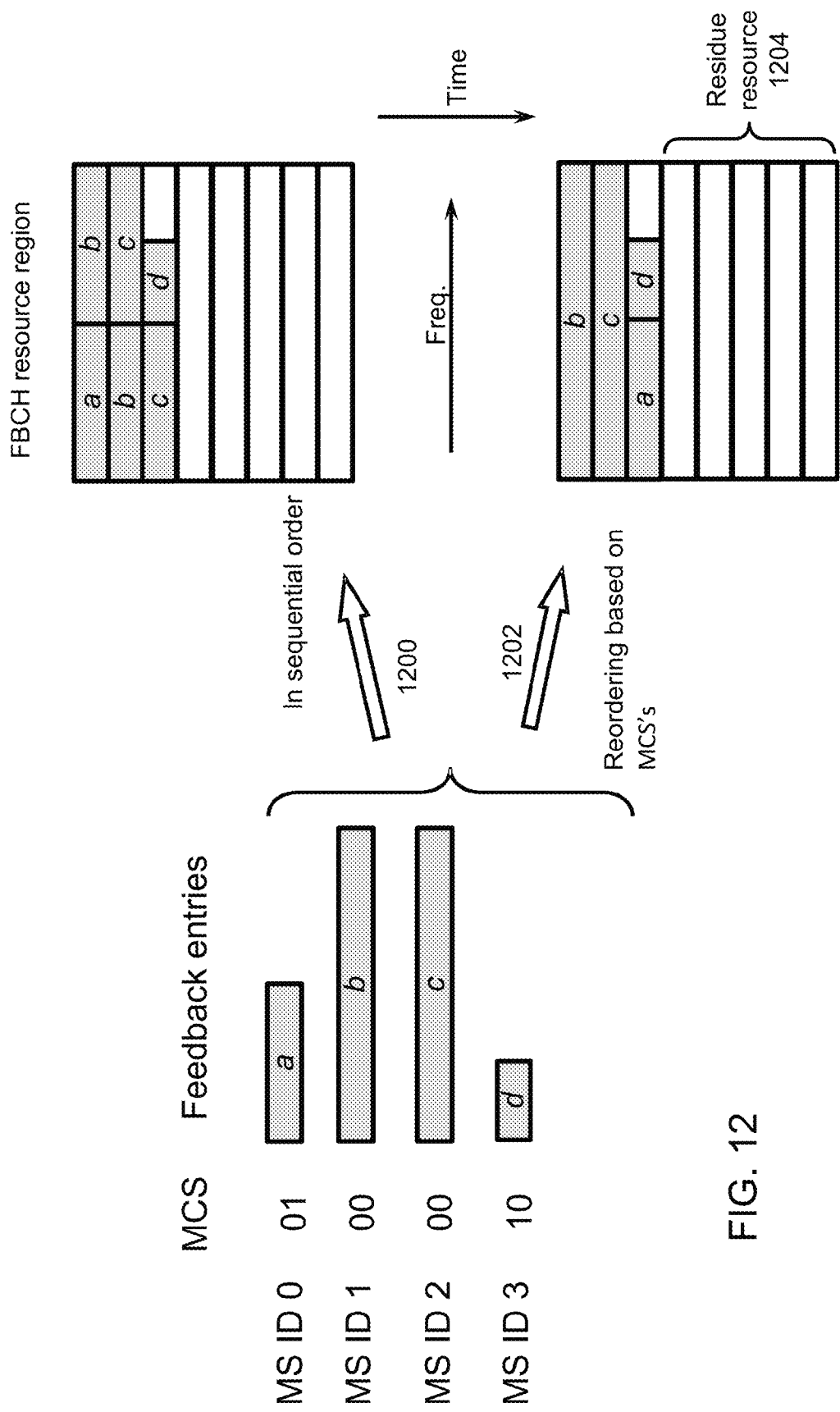
FIG. 12: Examples of filling in the FBCH resource region with feedback entries.

In an embodiment, a reference point (e.g., the starting coordinate) of a FBCH resource region may be specified in a D-CCCH entry, whereas the location information for each FBCH feedback entry is omitted from the DL resource assignment entry in a D-CCCH. Each MS decodes the relevant information about all the FBCH feedback entries in its group given in the DL resource assignment entries in a D-CCCH and deduce, based on the established rule, the location where its feedback entry is with respect to the given FBCH resource region. The established rule, which is understood by both the serving BS and its MS's without ambiguity, can correspond to the assignment order in the D-CCCH entry, to the MCS instructions, or other type of associations. For example, MS's may fill in the given FBCH resource region with their feedback entries in the same sequential order as they are in the DL resource assignment entry, as depicted in example 1200 in FIG. 12. In another example where fragmentation (i.e., a feedback entry is placed across two or more OFDM symbols) is undesirable, MS's may fill in the given FBCH with their feedback entries in the order primarily based on their MCS's and secondarily based on the sequential order in the DL resource assignment entry, as depicted in the other example 1202 in FIG. 12.

Any portion of an FBCH resource region that has not been used for the intended feedbacks can be used for other purposes. For example, the serving BS may explicitly assign the residue resource for some MS's to send other types of feedback entries. Alternatively, MS's can contend for the use of residue resource via a specific random access protocol.

In accordance with other embodiments of this invention, multiple antennas (e.g., beamforming or diversity combining) can be used in the reception of an FBCH. The antenna weights at the serving BS can be derived
1. based on the known pilot subcarriers for the FBCH,
2. based on some specific characteristics in the feedback entries in the FBCH (e.g., invariant coding elements in an entry can be used as desired response),
3. by applying a blind algorithm (linear or non-linear) such as the decision-directed technique to an feedback entry, or
4. any combination of the above.

Other Embodiments

In accordance with other embodiments of this invention, basic transmission units (e.g., OFDM symbols or TS's) in time can be reconfigured to form larger or smaller units to meet the requirements of certain applications, such as for larger or smaller cell operations, or same frequency network (SFN) application (e.g., video broadcast). The information on the reconfiguration of basic units is indicated in the SFCH.

Figure 13:
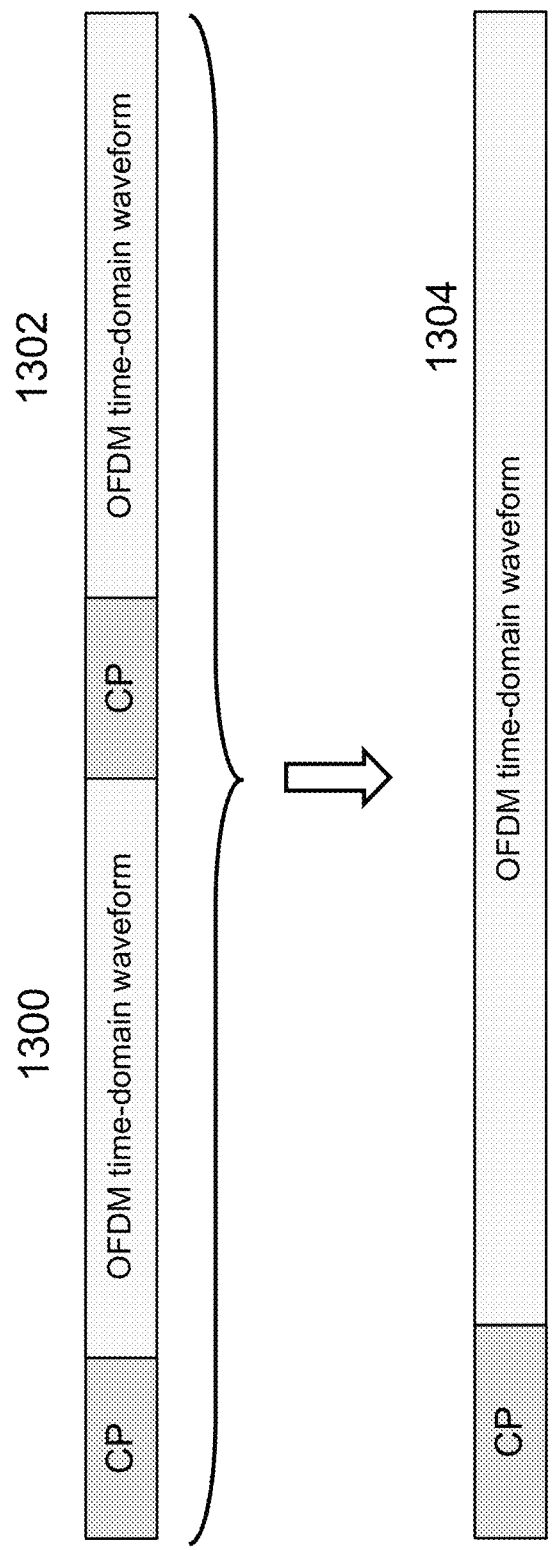
FIG. 13: An example of reconfiguring OFDM symbols.

In an embodiment, multiple regular consecutive OFDM symbols may be combined to form a longer symbol, the CP length of which may be different from that of a regular OFDM symbol. An example is depicted in FIG. 13, where two symbols 1300 1302 are combined into a longer symbol 1304. Conversely, a regular OFDM symbol may be divided to form multiple shorter consecutive OFDM symbols.

Figure 14:
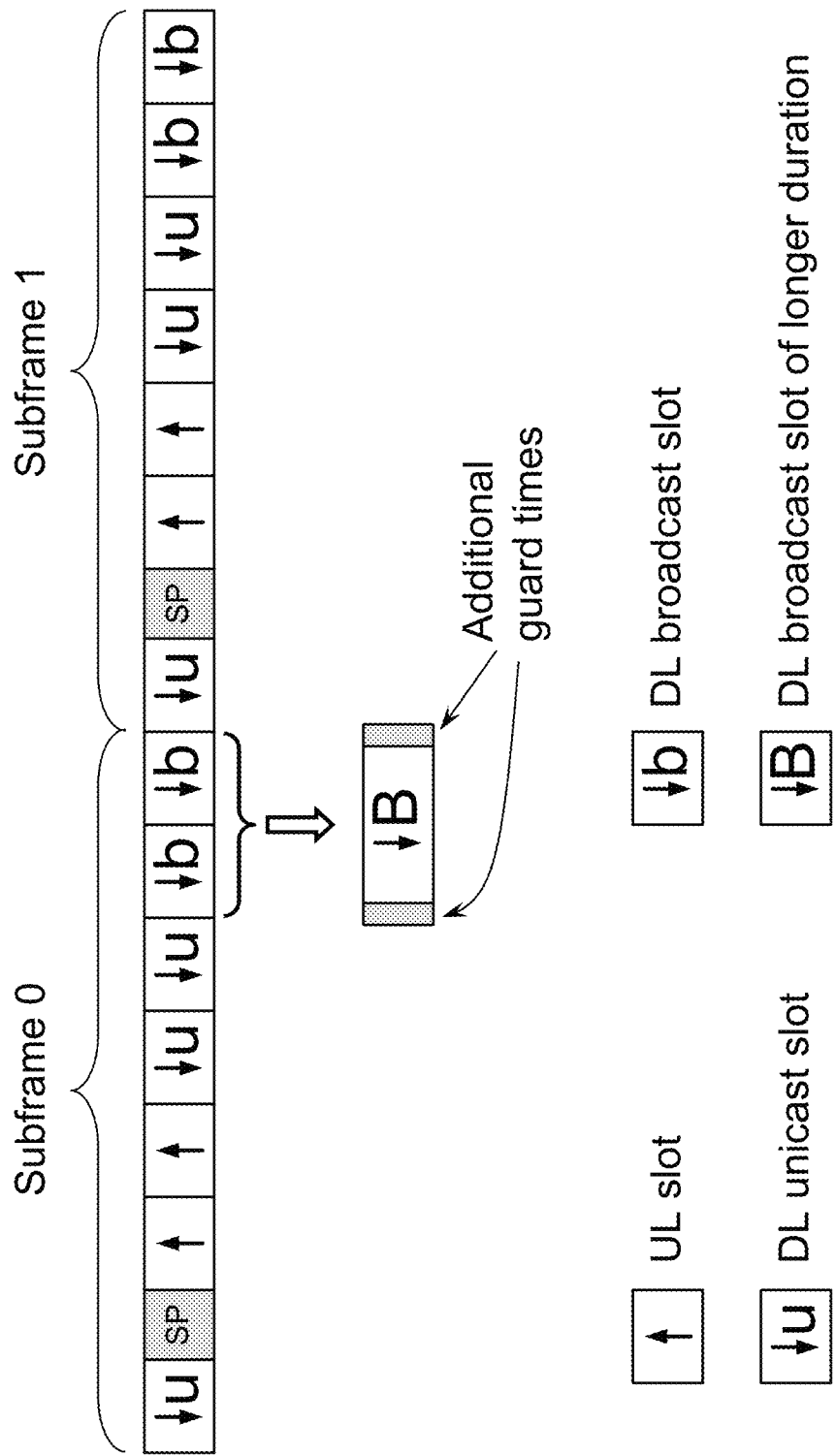
FIG. 14: An example of reconfiguring TS's.

In another embodiment, within a subframe, multiple regular consecutive DL TS's may be combined to form a longer time-slot, wherein additional guard times may be inserted to the beginning and the end of the longer time-slot and wherein regular or longer OFDM symbols may be used (see FIG. 14).

In yet another embodiment, during the longer time-slots, some BS's do not transmit while some BS's specifically set up for large area broadcasting are transmitting.

Figure 15:
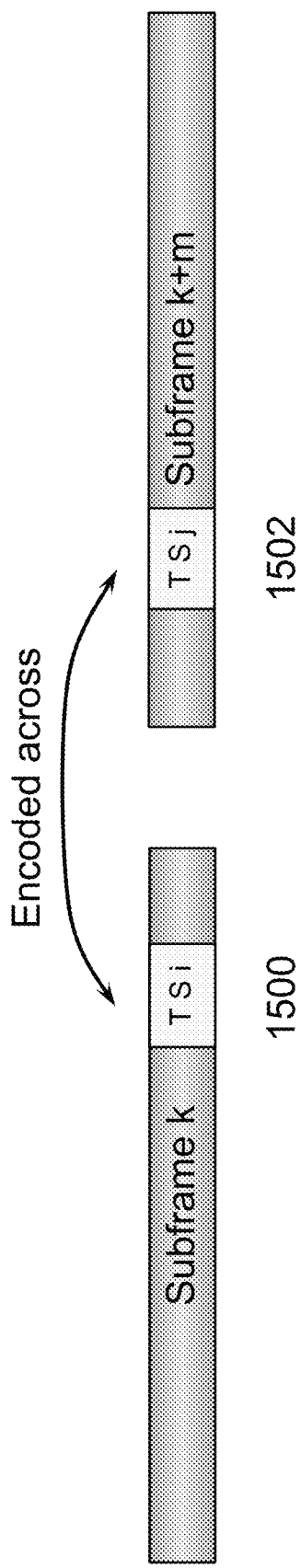
FIG. 15: An example of encoding across two different TS's.

In accordance with other embodiments of this invention, information data in a TS may be encoded together with the information data in other TS's. These TS's are not necessarily consecutive or within the same subframe, as depicted in FIG. 15 by subframes 1500 and 1502.

In accordance with other embodiments of this invention, an MS may feed back to its serving BS the statistic information on signal propagation conditions related to the applications (e.g., unicast data, broadcast video in the present band, broadcast video in other bands) and geographic locations. The serving BS may adjust and reconfigure, based on the long-term statistics collected from multiple MS's, the operation parameters and configurations to optimize system performance. In an embodiment, a BS may transmit data via a broadcast channel and MS's may transmit the statistics about the DL broadcast channel via the UL unicast channels. Based on the feedback information, the BS may adjust the pilot structure, transmission power, antenna configuration, modulation and coding scheme, and operation parameters to optimize the performance/capacity of this particular broadcast channel.

In accordance with other embodiments of this invention, multiple DL broadcast TS's may be grouped into bursts. Each burst carries an application data stream. A schedule for the bursts indicates the control and decoding information for each stream and is announced to the subscribing MS's via a particular means.

In one embodiment, the burst schedule may be transmitted periodically in a scheduling message. The resource allocation for the scheduling message is fixed and known to the subscribing MS's. Alternatively, the resource allocation for the scheduling message is specified in the SFCH.

In another embodiment, the burst schedule can be transmitted in a DL broadcast TS in a DL unicast TS. Furthermore, the burst scheduling information common to a group of cells may be transmitted by such a group of BS's using the same subcarriers, including data and pilot subcarriers, at essentially the same time, wherein macro-diversity can be achieved at the MS to decode the burst scheduling information. Alternatively, the burst scheduling information can be transmitted by each individual BS with cell-specific signals.

Figure 16:
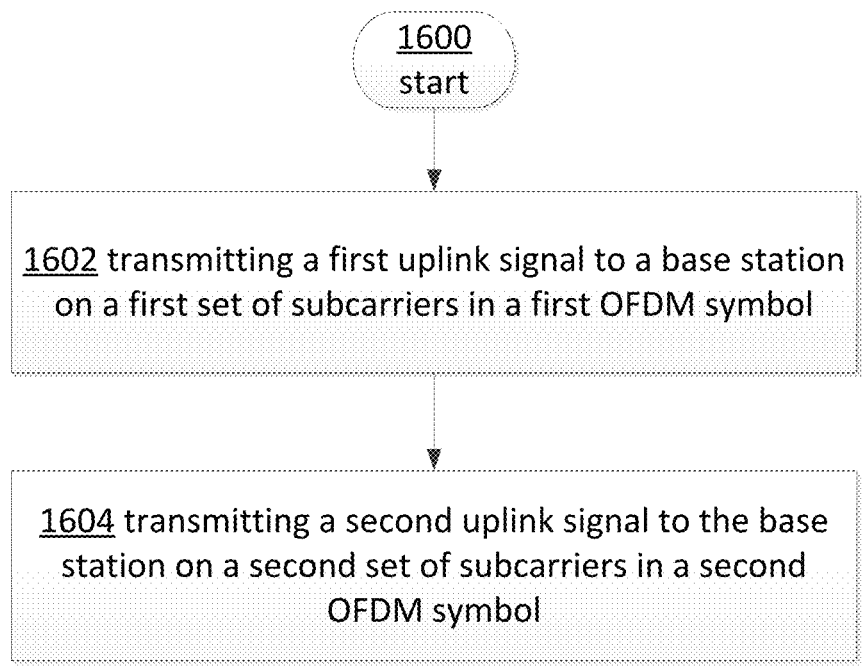
FIG. 16: An example of an operational procedure for practicing aspects of the present disclosure.

FIG. 16 depicts an exemplary operational procedure for signal transmission including operations 1600, 1602, and 1604. In one embodiment, the procedure may be performed by a mobile station in a communication system comprising a plurality of base stations operating in a plurality of cells.

Referring to FIG. 16, operation 1600 begins the operational procedure and operation 1602 illustrates transmitting a first uplink signal is transmitted to a base station on a first set of subcarriers in a first OFDM symbol. In an embodiment, the first set of subcarriers are modulated with a first signal sequence, where the first signal sequence is known to both the mobile station and the base station. Operation 1604 illustrates transmitting a second uplink signal to the base station on a second set of subcarriers in a second OFDM symbol. In one embodiment, the second set of subcarriers are modulated with the first signal sequence or a transform of the first signal sequence. The second set of subcarriers may further be modulated with a second signal sequence, the second signal sequence containing attribute information on a third set of subcarriers of a downlink signal received by the mobile station over a downlink channel. In some embodiments, the correspondence between the subcarriers in the third set and the subcarriers in the second set are known to both the mobile station and the base station.

In some embodiments, the second set of subcarriers contains a same set of subcarriers as in the first set of subcarriers, and the second OFDM symbol is a different OFDM symbol than the first OFDM symbol. Alternatively, the second OFDM symbol is a same OFDM symbol as the first OFDM symbol, and each subcarrier in the second set of the subcarriers is adjacent to a subcarrier in the first set of the subcarriers.

In other embodiments, the attribute information is related to a downlink channel profile comprising channel coefficients estimated by the mobile station on the third set of subcarriers; the attribute information is related to a downlink interference profile comprising interference levels experienced by the mobile station on the third set of subcarriers; or the attribute information is related to a downlink performance profile comprising signal-to-interference-plus-noise-ratio levels experienced by the mobile station on the third set of subcarriers.

In some embodiments, the amplitude of a subcarrier of the second uplink signal is set to be inversely proportional to the interference level at a subcarrier of the downlink channel; or the amplitude of a subcarrier of the second uplink signal is set to be inversely proportional to a sum of the interference level and the noise level at a subcarrier of the downlink channel.

In other embodiments, the transform of the first signal sequence is a conjugate of the first signal sequence. Alternatively, the transform of the first signal sequence is a sequence of magnitudes of each element contained in the first signal sequence.

In some embodiments, the subcarriers in the first uplink signal or the second uplink signal are a part or the entirety of total usable subcarriers in an OFDM symbol; the subcarriers in the first uplink signal or the second uplink signal are uniformly or non-uniformly distributed across a part of or the entire channel bandwidth; and/or the subcarriers in the first uplink signal or the second uplink signal is are composed of every nth subcarrier in an OFDM symbol, n being a positive integer.

In an embodiment, the base station is a serving base station in the mobile station's serving cell or a different base station in a different cell. In another embodiment, the downlink channel is a channel from a serving base station in the mobile station's serving cell to the mobile station, or a channel from a different base station in a different cell to the mobile station.

Figure 17:
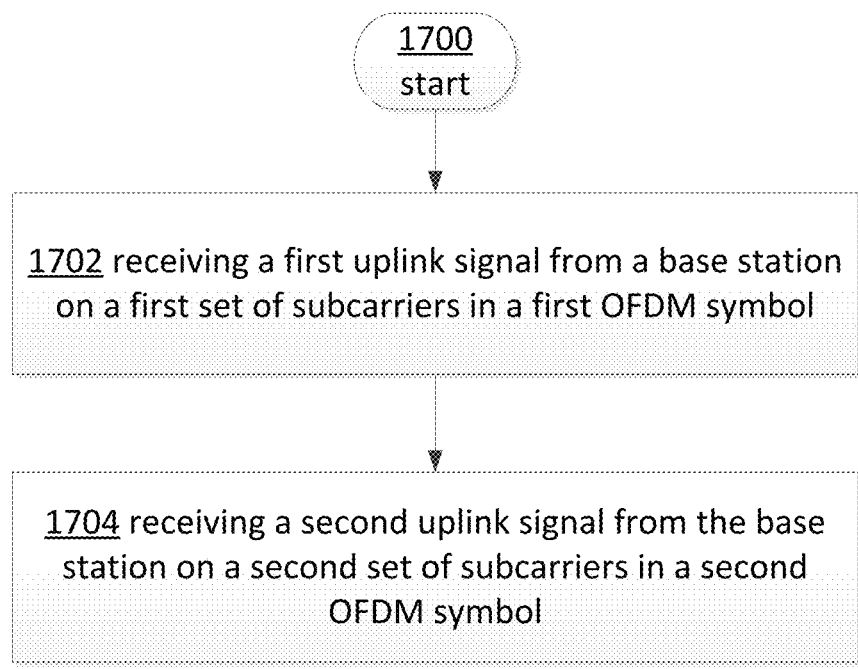
FIG. 17: An example of an operational procedure for practicing aspects of the present disclosure.

FIG. 17 depicts an exemplary operational procedure for signal transmission including operations 1700, 1702, and 1704. In one embodiment, the procedure may be performed by a base station in a communication system comprising a plurality of base stations and mobile stations.

Referring to FIG. 17, operation 1700 begins the operational procedure and operation 1702 illustrates receiving a first uplink signal from a mobile station on a first set of subcarriers in a first Orthogonal Frequency Division Multiplexing (OFDM) symbol. In an embodiment, the first set of subcarriers is modulated with a first signal sequence and the first signal sequence is known to both the mobile station and the base station. Operation 1704 illustrates receiving a second uplink signal from the mobile station on a second set of subcarriers in a second OFDM symbol. In an embodiment, the second set of subcarriers is modulated with the first signal sequence or a transform of the first signal sequence. The second set of subcarriers may further be modulated with a second signal sequence, the second signal sequence containing attribute information on a third set of subcarriers of a downlink signal received by the mobile station over a downlink channel. In some embodiments, the correspondence between the subcarriers in the third set and the subcarriers in the second set are known to both the mobile station and the base station.

In an embodiment, the base station derives the attribute information contained in the second signal sequence based on the received first uplink signal and the received second uplink signal.

Any of the above mentioned aspects can be implemented in methods, systems, computer readable media, or any type of manufacture. For example, a computer readable medium can store thereon computer executable instructions for signal detection and signal processing.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, methods and systems for communicating in a wireless communications system were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A signal transmission method for a mobile station in a communication system comprising a plurality of base stations operating in a plurality of cells, the method comprising:

transmitting a first uplink signal to a base station on a first set of subcarriers in a first Orthogonal Frequency Division Multiplexing (OFDM) symbol, wherein the first set of subcarriers are modulated with a first signal sequence, the first signal sequence known to both the mobile station and the base station; and transmitting a second uplink signal to the base station on a second set of subcarriers in a second OFDM symbol, wherein the second set of subcarriers are modulated with the first signal sequence or a transform of the first signal sequence and further modulated with a second signal sequence, the second signal sequence containing attribute information on a third set of subcarriers of a downlink signal received by the mobile station over a downlink channel, wherein the correspondence between the subcarriers in the third set and the subcarriers in the second set are known to both the mobile station and the base station.

2. The method of claim 1, wherein the second set of subcarriers contains a same set of subcarriers as in the first set of subcarriers, and the second OFDM symbol is a different OFDM symbol than the first OFDM symbol.

3. The method of claim 1, wherein the second OFDM symbol is a same OFDM symbol as the first OFDM symbol, and each subcarrier in the second set of the subcarriers is adjacent to a subcarrier in the first set of the subcarriers.

4. The method of claim 1, wherein the attribute information is related to a downlink channel profile comprising channel coefficients estimated by the mobile station on the third set of subcarriers.

5. The method of claim 1, wherein the attribute information is related to a downlink interference profile comprising interference levels experienced by the mobile station on the third set of subcarriers.

6. The method of claim 1, wherein the attribute information is related to a downlink performance profile comprising signal-to-interference-plus-noise-ratio levels experienced by the mobile station on the third set of subcarriers.

7. The method of claim 1, wherein an amplitude of a subcarrier of the second uplink signal is set to be inversely proportional to the interference level at a subcarrier of the downlink channel.

8. The method of claim 1, wherein the amplitude of a subcarrier of the second uplink signal is set to be inversely proportional to a sum of the interference level and the noise level at a subcarrier of the downlink channel.

9. The method of claim 1, wherein the transform of the first signal sequence is a conjugate of the first signal sequence.

10. The method of claim 1, wherein the transform of the first signal sequence is a sequence of magnitudes of each element contained in the first signal sequence.

11. The method of claim 1, wherein the subcarriers in the first uplink signal or the second uplink signal are a part or the entirety of total usable subcarriers in an OFDM symbol.

12. The method of claim 1, wherein the subcarriers in the first uplink signal or the second uplink signal are uniformly or non-uniformly distributed across a part of or the entire channel bandwidth.

13. The method of claim 1, wherein the subcarriers in the first uplink signal or the second uplink signal are composed of every nth subcarrier in an OFDM symbol, n being a positive integer.

14. The method of claim 1, wherein the base station is a serving base station in the mobile station's serving cell or a different base station in a different cell.

15. The method of claim 1, wherein the downlink channel is a channel from a serving base station in the mobile station's serving cell to the mobile station, or a channel from a different base station in a different cell to the mobile station.

16. A signal reception method for a base station in a communication system comprising a plurality of base stations and mobile stations, the method comprising:

receiving a first uplink signal from a mobile station on a first set of subcarriers in a first Orthogonal Frequency Division Multiplexing (OFDM) symbol, the first set of subcarriers modulated with a first signal sequence and the first signal sequence known to both the mobile station and the base station; and receiving a second uplink signal from the mobile station on a second set of subcarriers in a second OFDM symbol, the second set of subcarriers modulated with the first signal sequence or a transform of the first signal sequence, and further modulated with a second signal sequence, the second signal sequence containing attribute information on a third set of subcarriers of a downlink signal received by the mobile station over a downlink channel, wherein the correspondence between the subcarriers in the third set and the subcarriers in the second set are known to both the mobile station and the base station.

17. The method of claim 16, wherein the second set of subcarriers contains a same set of subcarriers as in the first set of subcarriers, and the second OFDM symbol is a different OFDM symbol than the first OFDM symbol.

18. The method of claim 16, wherein the second OFDM symbol is a same OFDM symbol as the first OFDM symbol, and each subcarrier in the second set of the subcarriers is adjacent to a subcarrier in the first set of the subcarriers.

19. The method of claim 16, wherein the attribute information is related to a downlink channel profile comprising channel coefficients estimated by the mobile station on the third set of subcarriers.

20. The method of claim 16, wherein the attribute information is related to a downlink interference profile comprising interference levels experienced by the mobile station on the third set of subcarriers.

21. The method of claim 16, wherein the attribute information is related to a downlink performance profile comprising signal-to-interference-plus-noise-ratio levels experienced by the mobile station on the third set of subcarriers.

22. The method of claim 16, wherein the transform of the first signal sequence is a conjugate of the first signal sequence.

23. The method of claim 16, wherein the transform of the first signal sequence is a sequence of magnitudes of each element contained in the first signal sequence.

24. The method of claim 16, wherein the downlink channel is a channel from the base station to the mobile station, or a channel from a different base station to the mobile station.

25. The method of claim 16, further comprising deriving the attribute information contained in the second signal sequence based on the received first uplink signal and the received second uplink signal.

26. A mobile station in a communication system comprising a plurality of base stations operating a plurality of cells, the mobile station comprising:
a receiver configured for receiving Orthogonal Frequency Division Multiplexing (OFDM) symbols; and
a transmitter configured to:
transmit a first uplink signal to a base station on a first set of subcarriers in a first OFDM symbol, wherein the first set of subcarriers are modulated with a first signal sequence, the first signal sequence known to both the mobile station and the base station; and
transmit a second uplink signal to the base station on a second set of subcarriers in a second OFDM symbol, wherein the second set of subcarriers are modulated with the first signal sequence or a transform of the first signal sequence, and further modulated with a second signal sequence, the second signal sequence containing attribute information on a third set of subcarriers of a downlink signal received by the mobile station over a downlink channel, wherein the correspondence between the subcarriers in the third set and the subcarriers in the second set are known to both the mobile station and the base station.

27. The mobile station of claim 26, wherein the second set of subcarriers contains a same set of subcarriers as in the first set of subcarriers, and the second OFDM symbol is a different OFDM symbol than the first OFDM symbol.

28. The mobile station of claim 26, wherein the second OFDM symbol is a same OFDM symbol as the first OFDM symbol, and each subcarrier in the second set of the subcarriers is adjacent to a subcarrier in the first set of the subcarriers.

29. The mobile station of claim 26, wherein the attribute information is related to a downlink channel profile comprising channel coefficients estimated by the mobile station on the third set of subcarriers.

30. The mobile station of claim 26, wherein the attribute information is related to a downlink interference profile comprising interference levels experienced by the mobile station on the third set of subcarriers.

31. The mobile station of claim 26, wherein the transform of the first signal sequence is a conjugate of the first signal sequence.

32. The mobile station of claim 26, wherein the transform of the first signal sequence is a sequence of magnitudes of each element contained in the first signal sequence.

33. A base station in a communication system comprising a plurality of base stations and mobile stations, the base station comprising:
a transmitter configured for transmitting Orthogonal Frequency Division Multiplexing (OFDM) symbols; and
a receiver configured to:
receive a first uplink signal from a mobile station on a first set of subcarriers in a first OFDM symbol, the first set of subcarriers modulated with a first signal sequence and the first signal sequence known to both the mobile station and the base station; and
receive a second uplink signal from the mobile station on a second set of subcarriers in a second OFDM symbol, the second set of subcarriers modulated with the first signal sequence or a transform of the first signal sequence, and further modulated with a second signal sequence, the second signal sequence containing attribute information on a third set of subcarriers of a downlink signal received by the mobile station over a downlink channel, wherein the correspondence between the subcarriers in the third set and the subcarriers in the second set known to both the mobile station and the base station.

34. The base station of claim 33, wherein the second set of subcarriers contains a same set of subcarriers as in the first set of subcarriers, and the second OFDM symbol is a different OFDM symbol than the first OFDM symbol.

35. The base station of claim 33, wherein the second OFDM symbol is a same OFDM symbol as the first OFDM symbol, and each subcarrier in the second set of the subcarriers is adjacent to a subcarrier in the first set of the subcarriers.

36. The base station of claim 33, wherein the attribute information is related to a downlink channel profile comprising channel coefficients estimated by the mobile station on the third set of subcarriers.

37. The base station of claim 33, wherein the attribute information is related to a downlink interference profile comprising interference levels experienced by the mobile station on the third set of subcarriers.

38. The base station of claim 33, wherein the transform of the first signal sequence is a conjugate of the first signal sequence.

39. The base station of claim 33, wherein the transform of the first signal sequence is a sequence of magnitudes of each element contained in the first signal sequence.

40. The base station of claim 33, further comprising a processor configured to derive the attribute information contained in the second signal sequence based on the received first uplink signal and the received second uplink signal.

* * * * *

UNITED STATES PATENT AND TRADEMARK OFFICE
CERTIFICATE OF CORRECTION

| | |
|---|---|
| PATENT NO. | : 8,565,181 B2 |
| APPLICATION NO. | : 13/414622 |
| DATED | : October 22, 2013 |
| INVENTOR(S) | : Xiaodong Li and Titus Lo |

It is certified that error appears in the above-identified patent and that said Letters Patent is hereby corrected as shown below:

In the Claims:

In column 22, line 24, Claim 33 after "carriers in the second set" add --are-- therefore.

Signed and Sealed this
Thirteenth Day of May, 2014

Michelle K. Lee
*Deputy Director of the United States Patent and Trademark Office*